US008895655B2

(12) United States Patent
Yamaguchi et al.

(10) Patent No.: US 8,895,655 B2
(45) Date of Patent: Nov. 25, 2014

(54) AUTOMOTIVE LAMP EXTENSION MOLDING

(75) Inventors: Toru Yamaguchi, Tokyo (JP); Hiroaki Furukawa, Tokyo (JP); Takeshi Fujisawa, Tokyo (JP); Akira Mitsui, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 13/884,025

(22) PCT Filed: Nov. 22, 2011

(86) PCT No.: PCT/JP2011/076960
§ 371 (c)(1),
(2), (4) Date: Jun. 26, 2013

(87) PCT Pub. No.: WO2012/070592
PCT Pub. Date: May 31, 2012

(65) Prior Publication Data
US 2013/0267641 A1 Oct. 10, 2013

(30) Foreign Application Priority Data

Nov. 24, 2010 (JP) ................. 2010-261661
Sep. 27, 2011 (JP) ................. 2011-211235
Nov. 10, 2011 (JP) ................. 2011-246747

(51) Int. Cl.
C08F 283/08 (2006.01)
C08K 5/13 (2006.01)
C08L 71/12 (2006.01)
F21S 8/10 (2006.01)
C08K 5/49 (2006.01)
C08L 9/02 (2006.01)

(52) U.S. Cl.
CPC ............. *C08L 71/12* (2013.01); *F21S 48/15* (2013.01); *F21S 48/25* (2013.01); *C08K 5/13* (2013.01); *C08K 5/49* (2013.01); *C08L 9/02* (2013.01)
USPC .......................................... 524/508; 524/323

(58) Field of Classification Search
CPC ................... C08L 71/12; C08K 5/13
USPC ....................................... 524/508
See application file for complete search history.

(56) References Cited

U.S. PATENT DOCUMENTS

| 4,386,176 | A | 5/1983 | Fukuda et al. |
| 4,681,906 | A | 7/1987 | Abolins et al. |
| 5,115,035 | A | 5/1992 | Shiraki et al. |
| 5,332,784 | A | 7/1994 | Shiraki et al. |
| 5,840,795 | A | 11/1998 | Freeman et al. |
| 5,871,846 | A | 2/1999 | Freeman et al. |
| 8,492,467 | B2 | 7/2013 | Yamaguchi et al. |
| 2004/0067374 | A1 | 4/2004 | Borst et al. |
| 2006/0241212 | A1 | 10/2006 | Ozeki |
| 2007/0259993 | A1 | 11/2007 | Yamaguchi |
| 2008/0051522 | A1 | 2/2008 | Birsak et al. |
| 2010/0036029 | A1 | 2/2010 | Yamaguchi et al. |
| 2010/0240813 | A1 | 9/2010 | Terada |
| 2011/0166269 | A1 | 7/2011 | Kondo et al. |
| 2012/0071599 | A1 | 3/2012 | Yamaguchi et al. |

FOREIGN PATENT DOCUMENTS

| EP | 0 770 637 | | 5/1997 | |
| EP | 0770637 | * | 5/1997 | ............. C08G 65/40 |
| JP | 48-40046 | | 11/1973 | |
| JP | 57-23649 | | 2/1982 | |
| JP | 62-100551 | | 5/1987 | |
| JP | 62-143967 | | 6/1987 | |
| JP | 63-99257 | | 4/1988 | |
| JP | 3-285949 | | 12/1991 | |
| JP | 5-320495 | | 12/1993 | |
| JP | 7-53865 | | 2/1995 | |
| JP | 07-316414 | | 12/1995 | |
| JP | 08-113702 | | 5/1996 | |
| JP | 9-167511 | | 6/1997 | |
| JP | 10-88028 | | 4/1998 | |
| JP | 11-60935 | | 3/1999 | |
| JP | 11-71477 | | 3/1999 | |
| JP | 11-119011 | | 4/1999 | |
| JP | 2002-069290 | | 3/2002 | |
| JP | 2002-079540 | | 3/2002 | |
| JP | 2002079540 | * | 3/2002 | ............. G03G 15/20 |
| JP | 2005-097578 | | 4/2005 | |
| JP | 2007-501956 | | 2/2007 | |
| JP | 2009-030045 | | 2/2009 | |
| JP | 2009-123731 | | 6/2009 | |
| JP | 2009-221387 | | 10/2009 | |
| JP | 2009221387 | * | 10/2009 | ............. C08L 71/12 |
| JP | 2010-138216 | | 6/2010 | |

(Continued)

OTHER PUBLICATIONS

International Search Report for PCT/JP2010/058664, mailed Aug. 10, 2010.
International Preliminary Report on Patentability for PCT/JP2010/058664, mailed Dec. 12, 2011.

*Primary Examiner* — Hui Chin
(74) *Attorney, Agent, or Firm* — Greenblum & Bernstein, P.L.C.

(57) ABSTRACT

[Problem to be Solved] The present invention has an object to provide an automotive lamp extension molding comprising a resin composition having a low specific gravity, being excellent in the balance of heat resistance and fluidity, and being excellent in gloss and brightness feeling of the surface of the molded article. [Solution] The automotive lamp extension molding according to the present invention comprises a resin composition comprising 50 to 95 mass % of a polyphenylene ether (A), and having a specific gravity in the range of 1.00 to 1.12. The reduced viscosity (measured at 30° C. using a chloroform solvent) of the (A) component is preferably 0.25 to 0.45 dl/g, and more preferably 0.25 to 0.38 dl/g.

19 Claims, No Drawings

(56) References Cited

FOREIGN PATENT DOCUMENTS

| JP | 2010-180325 | 8/2010 |
| WO | 2004/016692 | 2/2004 |
| WO | 2009/060917 | 5/2009 |
| WO | 2010/134608 | 11/2010 |

* cited by examiner

AUTOMOTIVE LAMP EXTENSION MOLDING

TECHNICAL FIELD

The present invention relates to an automotive lamp extension molding.

BACKGROUND ART

As materials used for automotive lamp-peripheral parts, mainly thermosetting resins such as unsaturated polyester resins and bulk molding compounds (BMC), and aluminum-made materials are conventionally broadly used. Although thermosetting resins are better than aluminum-made materials in the point of being of a light weight, since the specific gravities exceed 2.0, further weight reduction is demanded. The thermosetting resins have peculiar problems such as the complexity of the post-handling work of molded articles and working environment pollution due to dusts. Therefore, as materials used for automotive lamp-peripheral parts, the conversion of materials is progressing from thermosetting resins and aluminum-made materials to thermoplastic resins, such as polyetherimide and high-heat resistant polycarbonate, on which aluminum vapor-deposition can be carried out directly. However, even these thermoplastic resins are insufficient in the aspect of light weight, and materials having lower specific gravities are desired in consideration of the environmental and energy-saving aspect.

Polyphenylene ether resins are excellent in mechanical properties, electric properties, acid resistance, alkali resistance and heat resistance, and simultaneously have various properties such as low specific gravities, low water absorption rates and good dimensional stability. Therefore, polyphenylene ether resins are broadly used as materials for household appliances, OA devices, business machines, information devices and automobiles; and particularly in the applications requiring high heat resistance and rigidity such as automotive lamp-peripheral parts, the demand for resin compositions designed in a higher ratio of the content of a polyphenylene ether resin is anticipated in future.

Particularly in the applications to automotive lamp extension members, there are not a few cases where good molding fluidity, a remarkably high light reflection property, and direct aluminum vapor-depositability are required. Therefore, properties of the polyphenylene ether resin composition are anticipated to include sufficient heat resistance, mechanical properties and good molding fluidity, and simultaneously include, particularly, the good surface appearance and brightness feeling of molded articles.

A method of improving the heat resistance and the mechanical properties of a thermoplastic resin containing a polyphenylene ether resin usually involves a method of adding inorganic fillers such as glass fibers, carbon fibers, mica and talc. However, since the method, even if the addition of the inorganic fillers is in a small amount, remarkably spoils the toughness which the resin intrinsically has, and the surface gloss of molded articles, a resin composition obtained by the method cannot be used in many applications, and is remarkably difficult to apply particularly to automotive extension members.

A method of imparting an impact resistance to a polyphenylene ether resin involves blending of a rubber-reinforced polystyrene (HIPS), which is widely carried out, but the brightness feeling of an obtained molded article is likely to be spoiled even with a small blend amount of the rubber-reinforced polystyrene, as in the case of the addition of inorganic fillers described above.

As a technology relevant to an automotive lamp extension members made by using a polyphenylene ether-based resin, there is already a disclosure of a resin composition, using a blended material of a polyphenylene ether and a liquid crystal polyester, excellent in the balance of light weight, heat resistance, fluidity and mechanical properties (for example, see Patent Document 1).

There is a disclosure of a technology of a resin composition containing a relatively high-concentration polyphenylene ether, the resin composition being improved in the heat aging resistance and the molded film appearance by adding a specific stabilizer and being suitable for applications to automotive lamp parts including an automotive lamp extension (for example, see Patent Document 2).

CITED LIST

Patent Documents

Patent Document 1
Japanese Patent Application Laid-Open No. 2002-079540
Patent Document 2
Japanese Patent Application Laid-Open No. 2009-221387

SUMMARY OF INVENTION

Technical Problem

Whereas the resin composition described in Patent Document 1 is surely excellent in the heat resistance and the molding fluidity by addition of a liquid crystal polyester, there arises a risk of spoiling the brightness feeling of molded articles, caused by the addition of the crystalline polymer, and the resin composition is not always sufficient and has room for improvement as a material applied to an automotive lamp extension molding.

Whereas polyphenylene ether resin compositions conventionally proposed for automotive lamp members can be spread to molded bodies for automotive lamp members in various types of applications, since there are recognized a large number of white spots (crater-like marks 30 μm or more in diameter peculiar to polyphenylene ether resin compositions, the marks being generated by outgassing of fine gases during molding) on surfaces of molded bodies after aluminum vapor-deposition, the polyphenylene ether resin compositions, though being excellent in brightness feeling, are inferior in the appearance, and cannot always be said to be sufficient as a material applied to automotive lamp extension molded bodies.

Although the resin composition described in Patent Document 2 is surely improved in the heat aging resistance by addition of a specific stabilizer, there is no description therein of white spots and the improvement thereof in a molding after aluminum vapor-deposition; and there is no studies on an effective technology to improve white spots after aluminum vapor-deposition in the automotive lamp extension molding, in the claims and examples.

Therefore, the above-cited technical documents do not necessarily disclose preferable improving technologies for the resin compositions in applications to automotive lamp extension molded bodies.

Then, it is an object of the present invention to provide an automotive lamp extension molding comprising a resin composition having a low specific gravity, and a good balance of heat resistance and molding fluidity, and further being excellent in the gloss and the brightness feeling of the molded article.

Solution to Problem

The present inventors have exhaustively studies to solve the above-mentioned problems. As a result, it has been found that an automotive lamp extension molding comprising a resin composition comprising 50 to 95 mass % of a polyphenylene ether, and having a specific gravity in the range of 1.00 to 1.12 can solve the above-mentioned problems, and this finding has led to the completion of the present invention.

That is, the present invention is as follows.

[1] An automotive lamp extension molding, comprising a resin composition comprising 50 to 95 mass % of a polyphenylene ether (A), and having a specific gravity in the range of 1.00 to 1.12.

[2] The automotive lamp extension molding according to [1], wherein the (A) component has a reduced viscosity (measured at 30° C. using a chloroform solvent) of 0.25 to 0.45 dl/g.

[3] The automotive lamp extension molding according to [1] or [2], wherein the (A) component has a reduced viscosity (measured at 30° C. using a chloroform solvent) of 0.25 to 0.38 dl/g.

[4] The automotive lamp extension molding according to any of [1] to [3], wherein the resin composition further comprises 5 to 50 mass % of at least one resin component (B) selected from the group consisting of a non-rubber-reinforced styrene-based resin (B1), a styrene-based thermoplastic elastomer (B2) and a polycarbonate resin (B3).

[5] The automotive lamp extension molding according to [4], wherein the (B1) component is a styrene-acrylonitrile (AS) resin having an acrylonitrile (AN) unit content of 5 to 15 mass %.

[6] The automotive lamp extension molding according to [4] or [5], wherein the (B2) component is a hydrogenated substance of a styrene-conjugated diene compound block copolymer.

[7] The automotive lamp extension molding according to any of [4] to [6], wherein the (B2) component comprises a hydrogenated substance (B2-1) of a styrene-conjugated diene compound block copolymer having bound styrene content of 45 to 80 mass % and a hydrogenated substance (B2-2) of a styrene-conjugated diene compound block copolymer having bound styrene content of 20 to 40 mass %, at a mass ratio of (B2-1)/(B2-2)=4/1 to 1/4.

[8] The automotive lamp extension molding according to any of [4] to [7], wherein the (B3) component is an aromatic polycarbonate resin comprising a divalent phenol residue in a molecular skeleton thereof.

[9] The automotive lamp extension molding according to any of [4] to [8], wherein the (B3) component is a polycarbonate resin comprising a bisphenol residue having a cyclohexane ring incorporated in a molecular skeleton thereof.

[10] The automotive lamp extension molding according to any of [4] to [9], wherein the (B3) component has an MFR (a test method according to ISO1133, measured at a measurement temperature of 300° C. and at a load of 1.2 kg) in the range of 0.5 to 25 g/10 min.

[11] The automotive lamp extension molding according to any of [4] to [10], wherein the resin composition comprises 5 to 40 mass % of the (B3) component.

[12] The automotive lamp extension molding according to any of [4] to [11], wherein the (B) component comprises a styrene-acrylonitrile (AS) resin having an acrylonitrile (AN) unit content of 5 to 15 mass %, and a polycarbonate resin.

[13] The automotive lamp extension molding according to any of [1] to [12], wherein the resin composition further comprises 0.01 to 5 mass % of a heat stabilizer component (C).

[14] The automotive lamp extension molding according to [13], wherein the (C) component is a heat stabilizer having a melting point of 180° C. or more.

[15] The automotive lamp extension molding according to [13] or [14], wherein the (C) component is a hindered phenol-based heat stabilizer.

[16] The automotive lamp extension molding according to [13] or [14], wherein the (C) component is a phosphorus-based heat stabilizer.

[17] The automotive lamp extension molding according to any of [1] to [16], wherein the resin composition has an MFR (measured at 280° C. and at 10 kg) of 20 g/10 min or more, and a Vicat softening temperature (according to ISO306, measured at a test load of 50 N, and at a heating rate of 120° C./hr) of 160° C. or more.

[18] The automotive lamp extension molding according to any of [1] to [17], having a glossy surface having a gloss value at a measurement angle of 20° in the range of 90 to 140%.

[19] The automotive lamp extension molding according to any of the above [1] to [18], wherein the number of white spots (indicating protrusions having crater-like recesses 30 μm or more in diameter) present in an area of 52.4 mm$^2$ of a specular portion of the molding is 40 or less.

Advantageous Effects of Invention

The present invention can provide a molding which comprises a resin composition having a low specific gravity, and a good balance of heat resistance and fluidity, and further being excellent in gloss and brightness feeling of a glossy surface of the molded article, and the molding can be utilized favorably as a molding for an automotive lamp extension.

DESCRIPTION OF EMBODIMENT

Hereinafter, an embodiment according to the present invention (hereinafter, referred to as "the present embodiment") will be described in detail. Here, the present invention is not limited to the following embodiment, and various changes and modifications may be made within the gist of the present invention.

[Automotive Lamp Extension Molding]

An automotive lamp extension molding according to the present embodiment comprises a resin composition comprising 50 to 95 mass % of a polyphenylene ether (A), and having a specific gravity in the range of 1.00 to 1.12.

<<Resin Composition>>

A resin composition to be used in the present embodiment comprises 50 to 95 mass % of a polyphenylene ether (A), and has a specific gravity in the range of 1.00 to 1.12.

The present inventors have found that the use of the above-mentioned resin composition can provide an automotive lamp extension molding having a low specific gravity, and a good balance of heat resistance and fluidity, and further being excellent also in brightness feeling of a glossy surface of the molding. Hereinafter, each constituent of the above-mentioned resin composition will be described in detail.

<Polyphenylene Ether (A)>

The reduced viscosity of a polyphenylene ether (A) to be used in the present embodiment is in the range of preferably 0.25 to 0.45 dl/g, more preferably 0.25 to 0.40 dl/g, still more preferably 0.25 to 0.38 dl/g, and especially preferably 0.25 to 0.35 dL/g. The reduced viscosity of the polyphenylene ether (A) is preferably 0.25 dl/g or more from the viewpoint of sufficient mechanical properties, and is preferably 0.45 dl/g or less from the viewpoints of molding processability and the brightness feeling of a molding. In the present embodiment, the reduced viscosity is a value acquired by a measurement at 30° C. using a chloroform solvent.

It is preferable that a polyphenylene ether (A) comprises [a] or [b] of the following formula (1) as a repeating unit, and is a homopolymer comprising [a] or [b] of the general formula (1) as a constitutional unit, or a copolymer comprising [a] or [b].

[Formula 1]

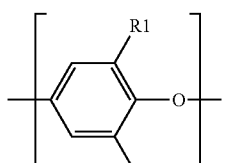

[a] of (1)

[Formula 2]

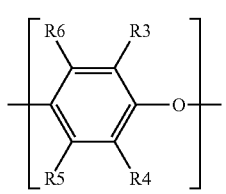

[b] of (1)

In [a] and [b] of the above formula (1), R1, R2, R3, R4, R5 and R6 are each independently preferably an alkyl group having 1 to 4 carbon atoms, an aryl group having 6 to 12 carbon atoms, or a monovalent residue such as a halogen or hydrogen. However, in such a case, the case where R5 and R6 are simultaneously hydrogen is excluded. The alkyl group is more preferably one having 1 to 3 carbon atoms; the aryl group is more preferably one having 6 to 8 carbon atoms; and the monovalent residue is more preferably hydrogen. The number of the repeating unit in [a] and [b] of the above formula (1), since depending on the molecular weight distribution of a polyphenylene ether (A), is not especially limited.

The homopolymer of the polyphenylene ether is not limited to the following, but includes, for example, poly(2,6-dimethyl-1,4-phenylene)ether, poly(2-methyl-6-ethyl-1,4-phenylene)ether, poly(2,6-diethyl-1,4-phenylene)ether, poly(2-ethyl-6-n-propyl-1,4-phenylene)ether, poly(2,6-di-n-propyl-1,4-phenylene)ether, poly(2-methyl-6-n-butyl-1,4-phenylene)ether, poly(2-ethyl-6-isopropyl-1,4-phenylene) ether, poly(2-methyl-6-chloroethyl-1,4-phenylene)ether, poly(2-methyl-6-hydroxyethyl-1,4-phenylene)ether and poly(2-methyl-6-chloroethyl-1,4-phenylene)ether, and above all poly(2,6-dimethyl-1,4-phenylene)ether is preferable from the viewpoints of the easiness of procurement of the raw material, and the processability.

The copolymer of the polyphenylene ether is not limited to the following, but includes, for example, copolymers having a polyphenylene ether structure as a main structure such as a copolymer of 2,6-dimethylphenol and 2,3,6-trimethylphenol, a copolymer of 2,6-dimethylphenol and o-cresol, and a copolymer of 2,3,6-trimethylphenol and o-cresol. Above all, a copolymer of 2,6-dimethylphenol and 2,3,6-trimethylphenol is preferable from the viewpoints of the easiness of the procurement of the raw material, and the processability; and the copolymer containing 90 to 70 mass % of 2,6-dimethylphenol and 10 to 30 mass % of 2,3,6-trimethylphenol is more preferable from the viewpoint of improvement in physical properties.

The polyphenylene ether (A) may be used singly or concurrently in two or more.

The polyphenylene ether (A) may comprise other various types of phenylene ether units as partial structures within limits not departing from the desired effect of the present embodiment. Such a phenylene ether unit is not limited to the following, but includes, for example, a 2-(dialkylaminomethyl)-6-methylphenylene ether unit and a 2-(N-alkyl-N-phenylaminomethyl)-6-methylphenylene ether unit described in Japanese Patent Application Laid-Open No. 01-297428 and Japanese Patent Application Laid-Open No. 63-301222.

Diphenoquinone and the like may be bonded in a small amount in the main chain of a polyphenylene ether. A functionalized polyphenylene ether may be made by reacting (modifying) part of or the whole of a polyphenylene ether with a functionalizing agent containing an acyl functional group, and one or more selected form the group consisting of carboxylic acids, acid anhydrides, acid amides, imides, amines, orthoesters, and hydroxyl and carboxylic acid ammonium salts.

The ratio (Mw/Mn value) of a weight-average molecular weight Mw and a number-average molecular weight Mn of the polyphenylene ether (A) is preferably 2.0 to 5.5, more preferably 2.5 to 4.5, and still more preferably 3.0 to 4.5. The Mw/Mn value is preferably 2.0 or more from the viewpoint of the molding processability of a resin composition, and is preferably 5.5 or less from the viewpoint of mechanical properties of the resin composition.

In the present embodiment, the weight-average molecular weight Mw and the number-average molecular weight Mn can be measured by gel permeation chromatography (GPC), and can be acquired using molecular weights in terms of polystyrene.

The residual volatile content of the polyphenylene ether (A) is preferably 0.3 mass % (3,000 ppm) or less, and more preferably 0.1 mass % (1,000 ppm) or less from the viewpoint of improvement in the surface appearance of a molding. Production of a polyphenylene ether having the residual volatile content of 0.3 mass % or less is not limited to the following, but the polyphenylene ether can suitably be produced by regulating the drying temperature and the drying time after the polymerization of the polyphenylene ether. The drying temperature includes 40 to 200° C., and is preferably 80 to 180° C., and more preferably 120 to 170° C. The drying temperature is desirably 40° C. or more from the viewpoint of the drying efficiency, and is desirably 200° C. or less from the viewpoint of the prevention of the seizure by fusion and deterioration.

The drying time includes 0.5 to 72 hours, and is preferably 2 to 48 hours, and more preferably 6 to 24 hours. In the case of attempting removal of the residual volatile content in a polyphenylene ether (A) in a relatively short time, the polyphenylene ether (A) is preferably dried at a high temperature. In such a case, in order to prevent the deterioration by heat, drying is suitably carried out in a nitrogen atmosphere, or in a vacuum drier.

In order to reduce a residual volatile content in a polyphenylene ether (A) and make the residual volatile content in the above-mentioned range by drying after the polymerization, the polymerization is preferably carried out previously using a polymerization solvent not adversely affecting the polymerization, almost not adversely affecting the environment, and having a relatively low boiling point to be easily vaporized. The polymerization solvent is not limited to the following, but includes, for example, toluene. More specifically describing, after a polyphenylene ether having a reduced viscosity in the above-mentioned range is polymerized by a known polymerization method, the obtained polymer is sufficiently dried using a vacuum drier or the like to thereby enable production of a polyphenylene ether having a residual volatile content in the above-mentioned range.

The content of a polyphenylene ether (A) to be used in the present embodiment is in the range of 50 to 95 mass % in 100 mass % of a resin composition. The content is preferably 60 to 90 mass %, and more preferably 65 to 85 mass %. The content of the polyphenylene ether (A) is 50 mass % or more from the viewpoint of the heat resistance required for the present applications, and is 95 mass % or less from the viewpoint of the retention of the appearance and the brightness feeling of a molding.

<Resin Component (B)>

A resin composition to be used in the present embodiment preferably further comprises 5 to 50 mass % of at least one resin component (B) selected from the group consisting of a non-rubber-reinforced styrene-based resin (B1), a styrene-based thermoplastic elastomer (B2) and a polycarbonate resin (B3), from the viewpoints of the improvements of the molding processability, the appearance of a molding, and the brightness feeling. The content of the resin component (B) is more preferably 10 to 40 mass %, and still more preferably 15 to 35 mass %, in 100 mass % of a resin composition. The content of the resin component (B) is preferably 50 mass % or less from the viewpoint of the heat resistance required for the present applications, and preferably 5 mass % or more from the viewpoints of the improvements of the impact resistance and the brightness feeling of a molding, and the molding fluidity, and the like.

The resin component (B) is at least one selected from the group consisting of a non-rubber-reinforced styrene-based resin (B1), a polycarbonate resin (B2) and a styrene-based thermoplastic elastomer (B3). Addition of such a resin component (B) to a polyphenylene ether (A), as little as possible spoiling the heat resistance which the polyphenylene ether (A) has, allows improvement in the melt fluidity during molding as well as the improvements of the appearance and brightness feeling of a molded article.

[Non-Rubber-Reinforced Styrene-Based Resin (B1)]

The non-rubber-reinforced styrene-based resin (B1) to be used in the present embodiment refers to a synthetic resin obtained by polymerizing a styrene-based compound, or a styrene-based compound and a compound copolymerizable with the styrene-based compound, in the absence of a rubbery polymer. The styrene-based compound means a compound represented by the following formula (2).

[Formula 3]

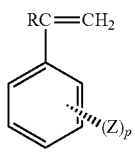

(2)

In the above formula (2), R is hydrogen, a lower alkyl or a halogen; Z is one or more selected from the group consisting of a vinyl group, hydrogen, a halogen and a lower alkyl group; and p is an integer of 0 to 5.

Specific examples of a compound represented by the above formula (2) is not limited to the following, but include styrene, α-methylstyrene, 2,4-dimethylstyrene, monochlorostyrene, p-methylstyrene, p-tert-butylstyrene and ethylstyrene. The compound copolymerizable with a styrene-based compound includes (meth)acrylate esters such as methyl methacrylate and ethyl methacrylate; unsaturated nitrile compounds such as acrylonitrile and methacrylonitrile; and acid anhydrides such as maleic anhydride, and is used together with a styrene-based compound. Above all, a preferable styrene-based resin (B1) is a styrene-acrylonitrile (AS) resin having an acrylonitrile (AN) unit content of 5 to 15 mass %.

The content of an acrylonitrile unit in the above AS resin is preferably 5 to 15 mass %, more preferably 5 to 12 mass %, and still more preferably 7 to 10 mass %, from the viewpoints of improvement in the surface appearance of an obtained molding and the securement of sufficient miscibility with a polyphenylene ether.

The non-rubber-reinforced styrene-based resin (B1) to be used in the present embodiment may be used singly or concurrently in two or more.

The content of the non-rubber-reinforced styrene-based resin (B1) to be used in the present embodiment is in the range of preferably 5 to 40 mass %, more preferably 8 to 30 mass %, still more preferably 8 to 25 mass %, and especially preferably 8 to 20 mass %, with respect to 100 mass % of the whole of a resin composition. The content of the non-rubber-reinforced styrene-based resin (B1) is preferably 5 mass % or more from the viewpoints of improvement in the appearance of a molded article and improvement in molding fluidity, and is preferably 40 mass % or less from the viewpoint of sufficient heat resistance.

[Styrene-Based Thermoplastic Elastomer (B2)]

A styrene-based thermoplastic elastomer (B2) is preferably a hydrogenated substance of a block copolymer having a styrene block and a conjugated diene compound block (hereinafter, referred also to as "styrene block-conjugated diene compound block copolymer"). The conjugated diene compound block is preferably at least one hydrogenated in a hydrogenation rate of 50% or more from the viewpoint of heat stability. The hydrogenation rate is more preferably 80% or more, and still more preferably 95% or more.

The styrene-based thermoplastic elastomer (B2) may be used singly or concurrently in two or more.

The conjugated diene compound block is not limited to the following, but includes, for example, polybutadiene, polyisoprene, poly(ethylene-butylene), poly(ethylene-propylene) and vinyl-polyisoprene. The conjugated diene compound block may be used singly or in combinations of two or more.

The form of the arrangement of repeating units constituting a styrene block-conjugated diene compound block copolymer may be of a linear type or a radial type. The block structure constituted of a polystyrene block and a rubber intermediate block may be any of two-block type, three-block type and four-block type. Above all, the styrene block-conjugated diene compound block copolymer is preferably a block copolymer of a three-blocks linear type constituted of a polystyrene-poly(ethylene-butylene)-polystyrene structure from the viewpoint of ability to sufficiently exhibit desired effects in the present embodiment. A butadiene unit may be contained in the range of not exceeding 30 mass % in a conjugated diene compound block.

In a resin composition to be used in the present embodiment, a functionalized styrene-based thermoplastic elastomer into which a functional group such as a carbonyl group or an amino group is incorporated may be used.

The carbonyl group is incorporated by modifying with an unsaturated carboxylic acid or its functional derivative. Examples of the unsaturated carboxylic acid or its functional derivative are not limited to the following, but include maleic acid, fumaric acid, itaconic acid, halogenated maleic acid, cis-4-cyclohexene-1,2-dicarboxylic acid, endo-cis-bicyclo[2,2,1]-5-heptene-2,3-dicarboxylic acid, and anhydrides, ester compounds, amide compounds and imide compounds of these dicarboxylic acids, and further acrylic acid, methacrylic acid, and ester compounds and amide compounds of these monocarboxylic acids. Above all, maleic anhydride is preferable from the viewpoints of the retention of the surface appearance of a molding and the impartation of impact resistance.

The amino group is incorporated by reacting an imidazolidinone compound, a pyrrolidone compound or the like with a styrene-based thermoplastic elastomer.

A resin composition to be used in the present embodiment preferably comprises, as a (B2) component, a hydrogenated substance (B2-1) of a styrene-conjugated diene compound block copolymer having bound styrene content of 45 to 80 mass % from the viewpoints of improvement in the gloss of a molded article, the impartation of higher impact resistance and the prevention of layer exfoliation. The resin composition preferably comprises the (B2-1) and further, more preferably comprises a hydrogenated substance (B2-2) of a styrene-conjugated diene compound block copolymer having bound styrene content of 20 to 40 mass %, at a mass ratio of (B2-1)/(B2-2)=4/1 to 1/4.

In the case of concurrent use of the (B2-1) and the (B2-2), a more preferable mass ratio range thereof is (B2-1)/(B2-2)=3/2 to 1/3, and an especially preferable mass ratio range thereof is (B2-1)/(B2-2)=1/1 to 1/2. The mass ratio is preferably (B2-1)/(B2-2)=4/1 or less from the viewpoint of the impartation of a sufficient impact resistance. For example, a (B2-2) component is more preferably blended so as to make such a mass ratio. The mass ratio is preferably (B2-1)/(B2-2)=1/4 or more from the viewpoints of improvement in the sufficient gloss of a molding and the prevention of layer exfoliation. For example, a (B2-2) component is preferably blended so as to make such a mass ratio.

The amount of bound styrene of a (B2-1) component is selected from a range of 45 to 80 mass %, and is in the range of preferably 50 to 75 mass %, and more preferably 55 to 70 mass %. The amount of bound styrene of a (B2-1) component is preferably 45 mass % or more from the viewpoint of the suppression of layer exfoliation by mixing with a (B2-2) component, and is preferably 80 mass % or less from the viewpoint of the retention of impact resistance.

The amount of bound styrene of a (B2-2) component is selected from a range of 20 to 40 mass %, and is in the range of preferably 25 to 40 mass %, and more preferably 25 to 35 mass %. The amount of bound styrene of a (B2-2) component is preferably 20 mass % or more from the viewpoint of the miscibility with the (A) component, and is preferably 40 mass % or less from the viewpoint of the impartation of a sufficient impact resistance.

The number-average molecular weight of a (B2-1) component is in the range of preferably 5,000 to 150,000, more preferably 10,000 to 120,000, and still more preferably 30,000 to 100,000. The number-average molecular weight of a (B2-1) component is preferably in the range of 5,000 to 150,000 from the viewpoint of the miscibility with a (B2-2) component.

The number-average molecular weight of a (B2-2) component is in the range of preferably 50,000 to 500,000, more preferably 100,000 to 400,000, and still more preferably 150,000 to 300,000. The number-average molecular weight of a (B2-2) component is preferably in the range of 50,000 to 500,000 from the viewpoint of the impartation of a sufficient impact resistance.

The ratio (Mw/Mn value) of the weight-average molecular weight Mw and the number-average molecular weight of the (B2) component is in the range of preferably 1.0 to 3.0, more preferably 1.0 to 2.0, and still more preferably 1.0 to 1.5. The ratio is preferably in the range of 1.0 to 3.0 from the viewpoint of mechanical properties. The weight-average molecular weight Mw and the number-average molecular weight Mn can be measured by gel permeation chromatography (GPC), and can be acquired from molecular weights in terms of polystyrene.

The content of a styrene-based thermoplastic elastomer (B2) to be used in the present embodiment is in the range of preferably 1 to 15 mass %, more preferably 2 to 12 mass %, still more preferably 4 to 10 mass %, and especially preferably 4 to 8 mass %, with respect to 100 mass % of the whole of a resin composition. The content of a styrene-based thermoplastic elastomer (B2) is preferably 1 mass % or more from the viewpoints of the impartation of impact resistance and improvement in the appearance of a molding, and is preferably 15 mass % or less from the viewpoint of the retention of the heat resistance and the rigidity.

[Polycarbonate Resin (B3)]

The (B) component preferably comprises a polycarbonate resin (B3). The (B) component more preferably comprises the above-mentioned styrene-acrylonitrile (AS) resin having an acrylonitrile (AN) unit content of 5 to 15 mass %, and a polycarbonate resin (B3). A resin composition comprising such a (B) component becomes good in the balance of the heat resistance and the fluidity; and a molding which has extremely few white spots on the surface of the molding, and good appearance can be obtained from the resin composition.

The polycarbonate resin (B3) may be used singly or concurrently in two or more.

The polycarbonate resin (B3) includes aromatic polycarbonates, aliphatic polycarbonates and aromatic-aliphatic polycarbonates, but in the present embodiment, aromatic polycarbonates are preferable.

An aromatic polycarbonate can be obtained by reacting a divalent phenol and a carbonate precursor.

A method of the reaction includes an interfacial polycondensation method, a melt transesterification method, a solid-phase transesterification method of a carbonate prepolymer, and a ring-opening polymerization method of a cyclic carbonate compound.

The divalent phenol includes, for example, hydroquinone, resorcinol, 4,4'-biphenol, 1,1-bis(4-hydroxyphenyl)ethane, 2,2-bis(4-hydroxyphenyl)propane (commonly known as bisphenol A), 2,2-bis(4-hydroxy-3-methyl phenyl)propane, 2,2-bis(4-hydroxyphenyl)butane, 1,1-bis(4-hydroxyphenyl)-1-phenylethane, 1,1-bis(4-hydroxyphenyl)cyclohexane, 1,1-bis(4-hydroxyphenyl)-3,3,5-trimethylcyclohexane, 2,2-bis(4-hydroxyphenyl)pentane, 4,4'-(p-phenylene diisopropylidene)diphenol, 4,4'-(m-phenylene diisopropylidene)diphenol, 1,1-bis(4-hydroxyphenyl)-4-isopropyl cyclohexane, bis(4-hydroxyphenyl)oxide, bis(4-hydroxyphenyl)sulfide, bis(4-hydroxyphenyl)sulfoxide, bis(4-hydroxyphenyl)sulfone, bis(4-hydroxyphenyl)ketone, bis(4-hydroxyphenyl)ester, 2,2-bis(3,5-dibromo-4-hydroxyphenyl)propane, bis(3,5-dibromo-4-hydroxyphenyl)sulfone, bis(4-hydroxy-3-methyl phenyl)sulfide, 9,9-bis(4-hydroxyphenyl)fluorene and 9,9-bis(4-hydroxy-3-methyl phenyl)fluorene.

Preferable divalent phenols are bis(4-hydroxyphenyl)alkanes, and above all, bisphenol A is more preferable from the viewpoint of the impact resistance.

The carbonate precursor includes, for example, carbonyl halides, carbonate esters and haloformates, and specifically includes phosgene, diphenyl carbonate and dihaloformates of divalent phenols.

When an aromatic polycarbonate is produced by an interfacial polymerization method using the divalent phenol and the carbonate precursor, as required, a catalyst, a terminator, an antioxidant to prevent the oxidation of the divalent phenol and the like may be used.

The aromatic polycarbonate may contain a branched aromatic polycarbonate obtained by copolymerizing tri- or more poly-functional aromatic compounds, a polyester carbonate obtained by copolymerizing aromatic or aliphatic (including alicyclic) bifunctional carboxylic acids, a copolymerized polycarbonate obtained by copolymerizing bifunctional alcohols (including alicyclic), and a polyester carbonate obtained by copolymerizing such bifunctional carboxylic acids and such bifunctional alcohols. The aromatic polycarbonate may be a mixture obtained by mixing two or more of the obtained polycarbonates.

The tri- or more polyfunctional aromatic compound usable is, for example, 1,1,1-tris(4-hydroxyphenyl)ethane or 1,1,1-tris(3,5-dimethyl-4-hydroxyphenyl)ethane.

In the case where an aromatic polycarbonate contains a polyfunctional compound to produce a branched aromatic polycarbonate, the proportion thereof is preferably 0.001 to 1 mol %, more preferably 0.005 to 0.9 mol %, and still more preferably 0.01 to 0.8 mol %, in the whole amount of the aromatic polycarbonate.

In the case where an aromatic polycarbonate is fabricated by a melt transesterification method, there is a case where a branch structure is produced as a side reaction; and the amount of such a branch structure is preferably 0.001 to 1 mol %, more preferably 0.005 to 0.9 mol %, and still more preferably 0.01 to 0.8 mol % in the whole amount of the aromatic polycarbonate. The content of the polyfunctional compound, and the amount of the branch structure can be calculated by measurement by $^1$H-NMR.

The aliphatic bifunctional carboxylic acid is preferably α,ω-dicarboxylic acid.

The aliphatic bifunctional carboxylic acid is preferably straight-chain saturated aliphatic dicarboxylic acids such as sebacic acid (decanedioic acid), dodecanedioic acid, tetradecanedioic acid, octadenanedioic acid and icosanedioic acid, and aliphatic dicarboxylic acids such as cyclohexanedicarboxylic acid.

The bifunctional alcohol is preferably alicyclic diols, and includes, for example, cyclohexanedimethanol, cyclohexanediol and tricyclodecanedimethanol.

As the aromatic polycarbonate, a polycarbonate-polyorganosiloxane copolymer obtained by copolymerizing a polyorganosiloxane unit therewith may be used.

The aromatic polycarbonate may be a mixture of two or more of various types of aromatic polycarbonates using a different aromatic polycarbonate out of the above-mentioned divalent phenols, aromatic polycarbonates containing branch components, various types of polyester carbonates, polycarbonate-polyorganosiloxane copolymers and the like.

The aromatic polycarbonate further usable is a mixture of two or more aromatic polycarbonates produced by a different production method shown below, aromatic polycarbonates produced using a different terminator, and the like.

In the polymerization reaction of an aromatic polycarbonate, the reaction by the interfacial polycondensation method is usually a reaction of a divalent phenol with phosgene, and is preferably carried out in the presence of an acid binder and an organic solvent.

As the acid binder, for example, alkaline metal hydroxides such as sodium hydroxide and potassium hydroxide, and amine compounds such as pyridine are used.

As the organic solvent, for example, halogenated hydrocarbons such as methylene chloride and chlorobenzene are used.

In order to promote the reaction, catalysts may be used, for example, tertiary amines such as triethylamine, tetra-n-butylammonium bromide and tetra-n-butylphosphonium bromide, quaternary ammonium compounds, and quaternary phosphonium compounds.

In the case where the polymerization reaction of an aromatic polycarbonate is carried out by an interfacial polycondensation method, the reaction temperature is preferably 0 to 40° C.; the reaction time is preferably nearly for 10 min to 5 hours; and pH during the reaction is preferably held at 9 or more.

In such a polymerization reaction by an interfacial polycondensation method, a terminator is preferably used. The terminator usable is monofunctional phenols. As the monofunctional phenols, preferably used are, for example, monofunctional phenols such as phenol, p-tert-butylphenol and p-cumylphenol. The monofunctional phenols further include decylphenol, dodecylphenol, tetradecylphenol, hexadecylphenol, octadecylphenol, eicosylphenol, docosylphenol and triacontylphenol.

The terminator may be used singly or as a mixture of two or more.

The reaction by the melt transesterification method in the polymerization reaction of an aromatic polycarbonate is usually a transesterification reaction of a divalent phenol with a carbonate ester, and is preferably carried out by a method in which a divalent phenol and a carbonate ester is mixed under heating in the presence of an inert gas, and a produced alcohol or phenol is distilled out.

The reaction temperature of the melt transesterification method, though depending on the boiling point of a produced alcohol or phenol, is usually preferably in the range of 120 to 350° C. Making the distilling-out of a produced alcohol or phenol to be easy is preferable by depressurizing the reaction system to about $1.33 \times 10^3$ to 13.3 Pa in the later period of the reaction. The reaction time is usually preferably about 1 to 4 hours.

The carbonate ester includes esters of an aryl group or an aralkyl group which may have a substituent and has 6 to 10 carbon atoms, and an alkyl group having 1 to 4 carbon atoms, and above all, diphenyl carbonate is preferable.

A polymerization catalyst can be used in order to accelerate the polymerization velocity in the melt transesterification method. The polymerization catalysts usable are catalysts including, for example, alkaline metal compounds such as sodium hydroxide, potassium hydroxide and sodium salts or potassium salts of divalent phenols; alkaline earth metal compounds such as calcium hydroxide, barium hydroxide and magnesium hydroxide; and nitrogen-containing basic compounds such as tetramethylammonium hydroxide, tetraethylammonium hydroxide, trimethylamine and triethylamine. Catalysts usually used for the esterification reaction and the transesterification reaction can further be used, such as alkoxides of alkaline (earth) metals, organic acid salts of alkaline (earth) metals, boron compounds, germanium compounds, antimony compounds, titanium compounds and zirconium compounds.

The polymerization catalyst may be used singly or in combinations of two or more. The use amount of these polymerization catalysts is selected in the range of preferably $1 \times 10^{-8}$ to $1 \times 10^{-3}$ equivalent weight, and more preferably $1 \times 10^{-7}$ to $5 \times 10^{-4}$ equivalent weight, with respect to 1 mol of a divalent phenol as a raw material.

In the melt transesterification method in the polymerization reaction of an aromatic polycarbonate, in order to decrease phenolic terminal groups, a compound may be added, such as 2-chlorophenyl carbonate, 2-methoxycarbonylphenyl phenyl carbonate and 2-ethoxycarbonylphenyl phenyl carbonate, in the later period of or after the finish of the condensation reaction.

By decreasing phenolic terminal groups, improvement in stability of a polymer can be achieved.

Further in the melt transesterification method, a deactivating agent to neutralize the activity of a catalyst is preferably used.

The amount of a deactivating agent is preferably used in a proportion of 0.5 to 50 mol with respect to 1 mol of a remaining catalyst. The amount of a deactivating agent is used in a proportion of preferably 0.01 to 500 ppm, more preferably 0.01 to 300 ppm, and still more preferably 0.01 to 100 ppm, with respect to an aromatic polycarbonate after the polymerization.

The deactivating agent preferably includes, for example, phosphonium salts such as a dodecylbenzenesulfonic acid tetrabutylphosphonium salt, and ammonium salts such as tetraethylammonium dodecylbenzylsulfate.

The aromatic polycarbonate has a viscosity-average molecular weight of preferably 10,000 or more, and more preferably 15,000 to 50,000.

The lower limit of the viscosity-average molecular weight is more preferably 16,000, still more preferably 17,000, and further still more preferably 18,000.

By contrast, the upper limit of the viscosity-average molecular weight is more preferably 26,000, still more preferably 25,000, and further still more preferably 23,000.

The aromatic polycarbonate may be a mixture of two or more different aromatic polycarbonates as described above, but in this case, an aromatic polycarbonate having a viscosity-average molecular weight out of the above range can naturally be mixed.

Especially a mixture with an aromatic polycarbonate having a viscosity-average molecular weight exceeding 50,000 has a high entropy elasticity, and has a feature of hardly causing appearance faults of a molding due to the rheological behavior represented by jetting. Therefore, in the case where appearance faults of a molding are caused, it is a suitable mode to use a mixture with an aromatic polycarbonate having a viscosity-average molecular weight exceeding 50,000 to suppress the appearance faults. This is advantageous in a gas injection molding or the like because the gas injection amount is stabilized, and also in a foam molding because foamed cells are stabilized and fine and uniform cells are easily formed.

The mixture is more preferably a mixture with an aromatic polycarbonate having a viscosity-average molecular weight of 80,000 or more, and still more preferably a mixture with an aromatic polycarbonate having a viscosity-average molecular weight of 100,000 or more. That is, an aromatic polycarbonate can be preferably used which has two or more peaks of the molecular weight distribution observed by a measurement method such as GPC (gel permeation chromatography).

An aromatic polycarbonate has an amount of a phenolic hydroxyl group of preferably 30 eq/ton or less, more preferably 25 eq/ton or less, and still more preferably 20 eq/ton or less.

Here, the value of the amount of a phenolic hydroxyl group can be made to be substantially 0 eq/ton by fully reacting a terminator.

The amount of the phenolic hydroxyl group is determined by carrying out a $^1$H-NMR measurement, calculating a molar ratio of a divalent phenol unit having a carbonate bond, a divalent phenol unit having a phenolic hydroxyl group, and a terminator unit, and converting to an amount of the phenolic hydroxyl group per polymer weight based on the molar ratio.

The viscosity-average molecular weight of the aromatic polycarbonate can be determined as follows. First, a specific viscosity is calculated by the following expression (I). In the following expression (I), the number of seconds ($t_0$) taken for flow-down of methylene chloride and the number of seconds (t) taken for flow-down of a sample solution can be determined by an Ostwald viscometer using the solution in which 0.7 g of an aromatic polycarbonate is dissolved in 100 ml of methylene chloride at 20° C. A viscosity-average molecular weight M can be determined by substituting the specific viscosity in the following expression (II).

$$\text{Specific viscosity } (\eta_{sp}) = (t - t_0)/t_0 \quad \text{(I)}$$

[$t_0$ is the number of seconds taken for flow-down of methylene chloride, and t is the number of seconds taken for flow-down of the sample solution]

A viscosity-average molecular weight M is determined by substituting the determined specific viscosity in the following expression (II).

$$\eta_{sp}/c = [\eta] + 0.45 \times [\eta]^2 c \text{ (provided } [\eta] \text{ is a limiting viscosity)} \quad \text{(II)}$$

$[\eta] = 1.23 \times 10^{-4} M^{0.83}$ $c = 0.7$

An aromatic polycarbonate can be used by mixing two or more types of aromatic polycarbonates such as ones having different divalent phenols, ones using a terminator and using no terminator, straight-chain and branched-chain ones, ones obtained by different production methods, ones using different terminators, ones using an aromatic polycarbonate and a polyester carbonate, and ones having different viscosity-average molecular weights.

A polycarbonate resin (B3) to be used in the present embodiment is preferably a polycarbonate resin (especially an aromatic polycarbonate resin) produced by a melt transesterification method (non-phosgene method) from the viewpoints of the moldability of a molding, and improvement in the appearance thereof (white spots). The case where a polycarbonate resin produced by a melt transesterification method is used can provide an automotive lamp extension molding having fewer white spots and better appearance than the case where a polycarbonate produced by a phosgene method is used.

The polycarbonate resin (B3) to be used in the present embodiment is preferably an aromatic polycarbonate resin containing a divalent phenol residue in its molecular skeleton.

The polycarbonate resin (B3) to be used in the present embodiment is further preferably a polycarbonate resin containing a bisphenol residue having a cyclohexane ring incorporated in its molecular skeleton from the viewpoints of the heat resistance, heat stability and chemical resistance of a molding.

The melt flow rate (MFR) of the polycarbonate resin (B3) to be used in the present embodiment is selected in the range of preferably 0.1 to 70 g/10 min, more preferably 0.5 to 35 g/10 min, still more preferably 0.5 to 25 g/10 min, and especially preferably 1 to 20 g/10 min. The MFR is preferably 0.1 g/10 min or more from the viewpoint of the impartation of sufficient fluidity, and is preferably 70 g/10 min or less from the viewpoints of the sufficient miscibility with a polyphenylene ether resin and the suppression of the hydrolysis during extrusion molding processing. The MFR is a value measured according to a test method ISO1133 at a measurement temperature of 300° C. and at a load of 1.2 kg.

The moisture content of the polycarbonate resin (B3) to be used in the present embodiment is preferably 2,500 ppm or less. The content is more preferably 2,000 ppm or less, still more preferably 1,000 ppm or less, and especially preferably 500 ppm or less. The moisture content of the polycarbonate resin (B3) is preferably 2,500 ppm or less from the viewpoints of the stability of hauling off a strand in the time of extrusion, and the suppression of generation of silver streaks on the surface of a molding due to hydrolysis in the time of molding. The moisture content can be measured by a Karl Fisher aquameter or the like.

The polycarbonate resin (B3) to be used in the present embodiment may contain a polycarbonate oligomer in order to achieve the improvements of the appearance of a molding and the fluidity. The viscosity-average molecular weight (Mv) of the polycarbonate oligomer is preferably 1,500 to 9,500, and more preferably 2,000 to 9,000. The measurement method of the viscosity-average molecular weight (Mv) is the same measurement method as the measurement method of the viscosity-average molecular weight of an aromatic polycarbonate as described above. The content of a polycarbonate oligomer in a polycarbonate resin (B3) is preferably 30 mass % or less.

The content of the polycarbonate resin (B3) to be used in the present embodiment is in the range of preferably 5 to 40 mass %, more preferably 8 to 30 mass %, still more preferably 8 to 25 mass %, and especially preferably 8 to 20 mass %, with respect to 100 mass % of the whole of a resin composition. The polycarbonate resin (B3) is blended preferably in 5 mass % or more from the viewpoint of improvement in the appearance (white spots) of a molding, and is blended preferably in 40 mass % or less from the viewpoints of the retention of sufficient heat resistance and the appearance of a molding, and the retention of a low specific gravity.

In the case where a polycarbonate resin (B3) is blended as a (B3) component to be used in the present embodiment, the concurrent use of the AS resin is preferable from the viewpoints of the miscibility of the (B3) component and improvement in the appearance (white spots) of a molding. The blend ratio (mass) of the (B3) component and the AS resin is preferably (B3)/AS resin=4/1 to 1/4, more preferably 2/1 to 1/2, and especially preferably 3/2 to 2/3.

In the present embodiment, as the polycarbonate resin (B3), not only virgin resins but polycarbonate resins reproduced from used products, so-called material-recycled polycarbonate resins may be used. Used products include, for example, optical recording media such as optical discs, light guide plates, vehicular transparent members such as automotive window glasses, automotive head lamp lenses and windshields, containers such as water bottles, spectacle lenses, and building members such as soundproof walls, glass windows and corrugated plates. Nonconforming products, crushed materials obtained from sprues, runners and the like, pellets obtained by melting the crushed materials, and the like can also be used. The use amount of a reproduced polycarbonate resin is preferably 80 mass % or less, and more preferably 50 mass % or less, with respect to a virgin resin.

<Heat Stabilizer Component (C)>

The resin composition for use in the present embodiment preferably further contains a heat stabilizer component (C) in an amount of 0.01 to 5 mass % from the viewpoints of heat stability of the resin composition as well as enhancements in surface appearance and brightness feeling of the molded article. The content of the heat stabilizer component (C) is more preferably in the range of 0.1 to 3 mass % and still more preferably in the range of 0.2 to 2 mass % with respect to 100 mass % of the resin composition.

Examples of the heat stabilizer as the (C) component includes hindered phenol-based and phosphorus-based heat stabilizers. Specific examples of the hindered phenol-based heat stabilizer include 3,3',3",5,5',5"-hexa-tert-butyl-a,a',a"-(mesitylene-2,4,6-triyl)tri-p-cresol, and 1,3,5-tris(3,5-di-tert-butyl-4-hydroxybenzyl)-1,3,5-triazine-2,4,6(1H,3H,5H)-trione. Specific examples of the phosphorus-based heat stabilizer include tris(2,4-di-tert-butylphenyl)phosphite, bis(2,4-dicumylphenyl)pentaerythritol diphosphite, and 3,9-bis(2,6-di-tert-butyl-4-methylphenoxy)-2,4,8,10-tetraoxa-3,9-diphosphapiro[5,5]undecane.

The heat stabilizer as the (C) component for use in the present embodiment is preferably a heat stabilizer having a melting point of 180° C. or more form the viewpoint of improving appearance (white spot) of the molded article. The melting point of the (C) component is more preferably (180 to 300° C., and further preferably 180 to 280° C. In the present embodiment, the melting point of the (C) component can be measured by a melting point measurement apparatus Model: B-545 (manufactured by Sibata Scientific Technology Ltd.).

In the case where no polycarbonate resin (B3) is contained in the resin composition for use in the present embodiment, the hindered phenol-based heat stabilizer is preferably used from the viewpoint of improving appearance (white spot).

On the other hand, in the case where the polycarbonate resin (B3) is contained in the resin composition for use in the present embodiment, the phosphorus-based heat stabilizer is preferably used from the viewpoints of improving appearance (white spot) and suppressing hydrolysis of the polycarbonate.

<Others>

The resin composition for use in the present embodiment preferably contains no inorganic filler as a reinforcing agent from the viewpoint of retaining brightness feeling of the molded article. The inorganic filler as a reinforcing agent is one commonly used for reinforcing a thermoplastic resin, and examples thereof include glass fiber, carbon fiber, glass flake, talc, and mica.

The resin composition for use in the present embodiment preferably contains no crystalline polymer from the viewpoint of retaining brightness feeling of the molded article. Examples of the crystalline polymer include polyamide, polypropylene, polyethylene, polyphenylene sulfide, polyacetal, polyethylene terephthalate, polybutylene terephthalate, and a liquid crystal polymer.

[Characteristics of Resin Composition]

The resin composition for use in the present embodiment preferably has a MFR (measured at 280° C. and at a load of 10 kg) of 20 g/min or more and a Vicat softening temperature (according to ISO 306, measured at a test load of 50 N and at a heating rate of 120° C./hr) of 160° C. or more from the viewpoint of the balance of thin wall moldability for light-weighting with the retention of heat resistance for a long period of time and durability of the molding. More preferably, the MFR is in the range of 20 to 150 g/min and the Vicat softening temperature is in the range of 160 to 210° C., and still more preferably, the MFR is in the range of 25 to 90 g/min and the Vicat softening temperature is in the range of 170 to 200° C.

Examples of a method of adjusting the MFR and the Vicat softening temperature of the resin composition within the above ranges include a method in which a polyphenylene ether (A) component having a reduced viscosity ranging from 0.25 to 0.38 dl/g is used, a method in which a general purpose polystyrene (GPPS) and an AS resin having an AN content of 5 to 15% are concurrently used as the (B1) component, and a method in which an AS resin having an AN content of 5 to 15% and the polycarbonate resin (B3) are concurrently used as the (B1) component.

The resin composition for use in the present embodiment has a specific gravity ranging from 1.00 to 1.12, preferably ranging from 1.04 to 1.10, and more preferably ranging from 1.05 to 1.08 from the viewpoint of the balance of the advantage of reduction in environment load by light-weighting with the design of a material that retains sufficient performances (heat resistance, mechanical strength, molded article appearance, and the like).

Examples of a method of adjusting the specific gravity of the resin composition within the above range include a method in which no inorganic filling material is formulated and a method in which the amount of the polycarbonate resin as the (B3) component to be formulated is allowed to be 40 mass % or less in the total resin composition.

In the present embodiment, the specific gravity of the resin composition can be measured using an electronic specific gravimeter SD-200L manufactured by AlfaMirage Co., Ltd.

[Method for Producing Resin Composition]

The resin composition for use in the present embodiment can be produced by melt-kneading the respective components, for example, the (A) component, the (B) component and/or the (C) component. The conditions of melt-kneading the (A) component, the (B) component and/or the (C) component for producing the resin composition are not particularly limited, and a twin screw extruder is suitably used from the viewpoint of stably obtaining, in a large amount, a resin composition capable of sufficiently exerting the desired effect of the present embodiment. As an example, there is a method in which when a ZSK 25 twin screw extruder (manufactured by Werner & Pfleiderer in Germany, number of barrels: 10, screw diameter: 25 mm, L/D=44); screw pattern having 2 kneading discs L, 6 kneading discs R and 2 kneading discs N) is used, the components are melt-kneaded under conditions of a cylinder temperature of 270 to 340° C., a screw rotation speed of 150 to 450 rpm and a vent vacuum degree of 11.0 to 1.0 kPa.

It is to be noted that when the resin composition for use in the present embodiment is produced using a larger (screw diameter: 40 to 90 mm) twin screw extruder, gel and carbide generated from the (A) component during extrusion may be incorporated into an extruded resin pellet to thereby cause surface appearance and brightness feeling of the molding to be deteriorated. Therefore, preferably, the (A) component is charged from a raw material-charging inlet at the most upstream (top feed) and an oxygen concentration in the inside of a shooter on the charging inlet at the most upstream is set to 3 volume % or less. The oxygen concentration is more preferably 1 volume % or less.

The oxygen concentration can be modulated by modulating a nitrogen feed amount and modulating the opening degree of a gas drain port in addition to sufficiently replacing the inside of a raw material storage hopper with nitrogen and sealing the way of a feed line from the raw material storage hopper to the raw material-charging inlet of an extruder by taping or the like so as not to allow air to come in and out, to thereby enhance sealability. The oxygen concentration in the inside of the shooter is preferably 3 volume % or less from the viewpoint of reducing gel and carbide generated during extrusion.

[Method for Producing Automotive Lamp Extension Molding]

The automotive lamp extension molding of the present embodiment can be obtained by molding the resin composition.

A molding method in the case of producing an automotive lamp extension molding by using the resin composition is not limited to the following, examples thereof suitably include injection molding, extrusion molding, vacuum molding, and pressure air molding, and injection molding is particularly more suitably used in view of molding appearance and brightness feeling.

Herein, the automotive lamp extension molding refers to a relatively large-sized light reflecting part present between a reflector being a light reflecting part located at the rear of a light source beam of an automotive head lamp and a lamp front cover, and serves to collect light from the light source and light reflected from the reflector. Although the molding is not required to have as high a heat resistance as needed for the reflector, it is required to have, at a much higher level, good brightness feeling on the glossy surface of the molding and surface appearance after aluminum vapor deposition, sufficient balance property between heat resistance and molding fluidity, light-weighting property (the molding being made of a material having a low specific gravity).

The molding temperature of the automotive lamp extension molding of the present embodiment is selected from, for example, the range of 270 to 340° C. for a cylinder setting temperature (the highest temperature portion). The molding temperature is preferably 280 to 330° C., further preferably 290 to 320° C., and still more preferably 300 to 320° C. The molding temperature is preferably 270° C. or more from the viewpoint of sufficient molding fluidity, and preferably 340° C. or less from the viewpoint of heat stability of the resin composition.

[Characteristics of Automotive Lamp Extension Molding]

The average thickness of the automotive lamp extension molding of the present embodiment is preferably selected from the range of 0.8 to 3.2 mm. The average thickness is more preferably 1.0 to 3.0 mm, still more preferably 1.2 to 2.5 mm, and particularly preferably 1.2 to 2.0 mm. The average thickness is preferably 3.2 mm or less from the viewpoint of light-weighting property, and 0.8 mm or more from the viewpoint of retaining sufficient moldability and strength.

The automotive lamp extension molding of the present embodiment is preferably molded using a specular mold polished by a diamond paste or the like to such a level that the surface roughness of a mold surface is made extremely low (average surface roughness: 0.2 μm or less). The polishing count of the specular mold is preferably #1000 or more, more preferably #2000 or more, and further particularly preferably #5000 or more. The polishing count is preferably #1000 or more from the viewpoint of expressing sufficient specular appearance.

A gloss value of a specular portion of the automotive lamp extension molding of the present embodiment is preferably in the range of 90 to 140% when being measured at a measurement angle of 20°, from the viewpoint of the balance of sufficient reflectivity of light emitted from a light source with the design of a material that retains sufficient physical properties (heat resistance, mechanical strength, molded article appearance, and the like). The gloss value is more preferably in the range of 90 to 140%, and still more preferably in the range of 100 to 140%. Use of the resin composition can allow the gloss value of the specular portion of the molding to be within the range.

In the present embodiment, the gloss value can be measured by a method described in Examples later.

Preferably, a surface of the automotive lamp extension molding of the present embodiment is partially or entirely subjected to an aluminum vapor deposition treatment after molding. The automotive lamp extension molding of the present embodiment is preferably subjected to a plasma treatment in advance because the surface of the molding is activated before aluminum vapor deposition to thereby enhance sealability of an aluminum film. In addition, the surface of the molding after aluminum vapor deposition is preferably subjected to a plasma polymerization treatment to be coated with a silicon dioxide film by such polymerization in order to prevent deteriorations in appearance and brightness feeling by oxidation and the like.

In the automotive lamp extension molding of the present embodiment, a number of white spots (indicating protrusions having crater-like recesses 30 μm or more in diameter) present in a certain area (52.4 $mm^2$) of a specular portion is preferably 40 or less from the viewpoint of retaining still better molded article appearance. The number of white spots is more preferably 30 or less, still more preferably 20 or less, and particularly more preferably 10 or less. Use of the resin composition can allow the number of white spots present in the certain area (52.4 $mm^2$) of the specular portion of the molding to be within the range.

In the present embodiment, the number of white spots can be measured by a method described in Examples later.

The automotive lamp extension molding of the present embodiment can also be molded by partially formulating a reworked (recycled) material (crushed article of the molded article once molded, and the like) during molding. The proportion of the reworked (recycled) material formulated in the automotive lamp extension molding is preferably in the range of 0 to 40 mass %, more preferably in the range of 2 to 25 mass %, still more preferably in the range of 5 to 15 mass %, and particularly more preferably in the range of 5 to 10 mass %. The proportion formulated is preferably 40 mass % or less from the viewpoint of retaining sufficient physical properties and appearance.

EXAMPLES

Hereinafter, the present embodiment is described with reference to Examples and Comparative Examples in more detail, but the present embodiment is not limited only to these Examples. Measuring methods of physical properties and raw materials used in Examples and Comparative Examples are shown below.

[Measuring Methods of Physical Properties]

It is assumed that any molded piece used for measurement of physical properties was a molded piece prepared as follows.

Each of the resin composition pellets obtained in Examples and Comparative Examples was dried in a hot air dryer at 120° C. for 3 hours. The resin composition pellet after drying was molded by an injection molding machine (IS-80EPN, manufactured by Toshiba Machine Co., Ltd.) at a cylinder temperature of 300° C., a mold temperature of 120° C. and an injection speed (panel setting value) of 85% to obtain a dumbbell-shaped molded piece having a width of 13 mm and a thickness of 3.2 mm, or a strip-shaped molded piece having a width of 13 mm and a thickness of 6.4 mm.

Herein, the dumbbell molded piece having a width of 13 mm and a thickness of 3.2 mm in each sample was molded under conditions of a gauge pressure of SSP (short shot pressure) of the molded piece plus 5 kg/$cm^2$ and a molding cycle: injection time/cooling time=10 sec/10 sec; and the strip molded piece having a width of 13 mm and a thickness of 6.4 mm was molded under conditions of the same gauge pressure of SSP as the case of the dumbbell molded piece and a molding cycle: injection time/cooling time=15 sec/15 sec.

1. Specific Gravity

A specific gravity was measured using an electronic specific gravimeter SD-200L manufactured by AlfaMirage Co., Ltd.

2. Vicat Softening Temperature (Vicat Softening Point)

A test piece having a shape measuring 35 mm×13 mm×3.2 mm (thickness) produced by cutting the dumbbell molded piece was used and the Vicat softening temperature thereof was measured according to ISO 306 using an HDT tester S-6M Model (manufactured by Toyo Seiki Seisaku-Sho, Ltd.) under the following conditions: test load: 50N, indenter tip shape: round, cross-section area: 1 $mm^2$, heating rate: 120° C./hr and number of measurements: n=2.

For evaluation criteria, it was determined that as the Vicat softening temperature is higher, heat resistance is more excellent and a material design for the present usage is more advantageous.

3. Fluidity (MFR)

Each of the resin composition pellets obtained in Examples and Comparative Examples was dried in a hot air dryer at 120° C. for 3 hours. After drying, a MFR (Melt Flow Rate) was measured using a melt indexer (P-111, manufactured by Toyo Seiki Seisaku-Sho, Ltd.) at a cylinder setting temperature of 280° C. and at a load of 10 kg.

For evaluation criteria, it was determined that as the MFR is higher, fluidity is more excellent and a material design for the present usage is more advantageous.

4. IZOD Impact Value

A strip test piece having a shape measuring 64 mm×13 mm×6.4 mm (thickness) produced by cutting the strip molded piece was used and the IZOD impact value thereof was measured as a notched IZOD impact value at 23° C. according to ASTM D256.

For evaluation criteria, it was determined that as the IZOD impact value is higher, a material design for the present usage is more advantageous.

5. Gloss Value (Gloss: Measurement Angle: 20°)

A gloss value (gloss) was measured on the center portion of the dumbbell test piece having a thickness of 3.2 mm produced by the molding method at a measurement angle of 20° by a gloss meter (VG7000, manufactured by Nippon Densyoku Industries Co., Ltd.).

For evaluation criteria, it was determined that as the gloss value is higher, glaze of the molded piece is better to the eye, and brightness feeling thereof is more excellent.

6. Easiness of Peeling of Molded Article

A SFD (spiral flow) molded article having a thickness of 1 mm was prepared using an injection molding machine (IS-80EPN, manufactured by Toshiba Machine Co., Ltd.) as follows.

Each of the resin composition pellets obtained in Examples and Comparative Examples below was dried at 120° C. for 3 hours. The resin composition pellet after drying was molded using the injection molding machine under conditions of a gauge pressure of 120 MPa, an injection speed of 95%, a molding cycle: injection time/cooling time=10 sec/10 sec; to obtain the molded article. The presence of peeling of the obtained molded article was confirmed. The case without peeling was rated "Good" and the case with peeling was rated "Poor", and it was determined that the case rated "Good" is more advantageous for the material design of the present usage.

7. Brightness Feeling (Visual) after Heat Aging

The dumbbell test piece having a thickness of 3.2 mm was used and aged in an oven set at 150° C. for 250 hr, and then brightness feeling of the molded piece was visually evaluated. The case without a problem in brightness feeling was rated "Good", and the case in which fogging was caused on the surface of the molded piece to result in obvious deterioration in brightness feeling as compared with that before aging was rated "Fogging". It was determined that the case rated "Good" can be suitably used in the present usage.

8. Number of White Spots (Craters 30 μm or More in Diameter)

Each of the resin composition pellets obtained in Examples and Comparative Examples was dried in a hot air dryer at 120° C. for 3 hours. The resin composition pellet after drying was molded by an injection molding machine (IS-80EPN, manufactured by Toshiba Machine Co., Ltd.) equipped with a specular mold for a film gate, having a surface polished by #5000 and a dimension of 100 mm×100 mm×2 mm (thickness), at a cylinder temperature of 320° C., a mold temperature of 120° C., an injection pressure (gauge pressure) of 70 MPa and an injection speed (panel setting value) of 85% to obtain a molded plate. The obtained molded plate was placed in a vapor deposition apparatus under a vacuum state, inert gas and oxygen were introduced into the apparatus to allow the inside of a chamber to be in a plasma state, and a plasma treatment for activating the surface of the molded plate was performed to perform aluminum vapor deposition in the vapor deposition apparatus under vacuum. Furthermore, a plasma polymerization treatment was performed to form a silicon dioxide film by polymerization as a protective film for an aluminum vapor-deposited surface. The thickness of the aluminum film was 80 nm, and the thickness of the silicon dioxide film was 50 nm. A picture of the center portion of the aluminum vapor-deposited surface of the molded plate subjected to aluminum vapor deposition (hereinafter, also designated as "aluminum vapor-deposited plate") was taken by a digital microscope (Model: VHX 1000, manufactured by Keyence Corporation) as a 40-fold magnified photograph. An average number of protrusions per taken field-of view was calculated by counting numbers of protrusions having crater-like recesses 30 μm or more in diameter (traces formed by drained gas during molding) present in one taken field-of-view (area: 52.4 mm$^2$) for all of 5 specular molded plates, and dividing the sum of the numbers by 5. The average number of protrusions was defined as a number of white spots.

9. Appearance of Aluminum Vapor-Deposited Surface of Molded Plate (Visual)

The aluminum vapor-deposited surface of the aluminum vapor-deposited plate produced by the above method was visually observed, and evaluated according to the following ratings "Good" to "Poor": "Good": no white spots were visually observed and appearance was favorable; "Fair": white spots were observed, but appearance was generally favorable; and "Poor": many white spots were observed and appearance was definitely inferior; and it was determined that the case rated "Good" can be suitably used in the present usage.

10. Chemical Resistance (IPA/CHX=60/40 Immersion Test)

The dumbbell test piece having a thickness of 3.2 mm was mounted to a bending form having a strain of 1%, immersed in a mixed solution of isopropyl alcohol (IPA) and cyclohexane (CHX) ((IPA)/(CHX)=60/40 mass %) and left to stand at 23° C. for 30 minutes. Thereafter, the test piece was removed from the bending form, a solvent was wiped off with tissue paper, and the test piece was left to stand at 23° C. for 2 hours or more. Thereafter, the test piece after immersing was subjected to a tensile test (according to ASTM D638) to determine a tensile strength (TY). The proportion of the tensile strength of the test piece after immersing to the tensile strength of a usual sample, assumed to 100%, (tensile strength retention rate (%)) was determined (number of tests: n=3). Herein, "Poor (fracture)" in Table 3 means that the tensile strength could not be measured because all of 3 test pieces were fractured during immersing.

11. Chemical Resistance (Application of Linoleic Acid)

The dumbbell test piece having a thickness of 3.2 mm was mounted to a bending form having a strain of 1%, subjected to application of linoleic acid with a width of 3 mm on the center line of the dumbbell, and left to stand at 23° C. for 30 minutes. Thereafter, the dumbbell test piece was removed from the bending form, the linoleic acid was wiped off with tissue paper, and the test piece was further washed with ethanol and then left to stand at 23° C. for 2 hours or more. Thereafter, the test piece after standing was subjected to a tensile test (according to ASTM D638) to determine a tensile strength (TY). The proportion of the tensile strength of the test piece after standing to the tensile strength of a usual sample, assumed to 100%, (tensile strength retention rate (%)) was determined (number of tests: n=3).

[Raw Materials]

<Polyphenylene Ether (A)>

(PPE-1) Poly(2,6-dimethyl-1,4-phenylene)ether having a reduced viscosity (measured at 30° C. using a chloroform solvent) of 0.48 dl/g was used (hereinafter, sometimes also referred to as "PPE-1").

(PPE-2) Poly(2,6-dimethyl-1,4-phenylene)ether having a reduced viscosity (measured at 30° C. using a chloroform solvent) of 0.40 dl/g was used (hereinafter, sometimes also referred to as "PPE-2").

(PPE-3) Poly(2,6-dimethyl-1,4-phenylene)ether having a reduced viscosity (measured at 30° C. using a chloroform solvent) of 0.35 dl/g was used (hereinafter, sometimes also referred to as "PPE-3").

(PPE-4) Poly(2,6-dimethyl-1,4-phenylene)ether having a reduced viscosity (measured at 30° C. using a chloroform solvent) of 0.30 dl/g was used (hereinafter, sometimes also referred to as "PPE-4").

(PPE-5) Poly(2,6-dimethyl-1,4-phenylene)ether having a reduced viscosity (measured at 30° C. using a chloroform solvent) of 0.25 dl/g was used (hereinafter, sometimes also referred to as "PPE-5").

(PPE-6) Poly(2,6-dimethyl-1,4-phenylene)ether having a reduced viscosity (measured at 30° C. using a chloroform solvent) of 0.22 dl/g was used (hereinafter, sometimes also referred to as "PPE-6").

<Resin Component (B)>

(GPPS) General purpose polystyrene (Polystyrene 680 (registered trademark), produced by PS Japan Corporation) was used (hereinafter, sometimes also referred to as "GPPS"). Herein, the general purpose polystyrene was a polystyrene not containing a rubber component, namely, a non-rubber-reinforced polystyrene.

(AS) Styrene-Acrylonitrile Resin

A styrene-acrylonitrile resin produced as follows was used.

A mixed liquid containing 4.7 parts by mass of acrylonitrile, 73.3 parts by mass of styrene, 22 parts by mass of ethylbenzene and 0.02 parts by mass of t-butyl peroxy isopropyl carbonate as a polymerization initiator was continuously supplied to a complete mixing reactor having a volume of 5 L at a flow rate of 2.5 L/hour, and polymerized at 142° C. to obtain a polymerization liquid.

The obtained polymerization liquid was continuously conducted to a vented extruder to remove an unreacted monomer and a solvent under conditions of 260° C. and 40 Torr, and the resultant polymer was continuously cooled and solidified, and finely cut to obtain a particulate styrene-acrylonitrile resin (hereinafter, sometimes also referred to as "AS").

The styrene-acrylonitrile resin was subjected to a compositional analysis by infrared spectroscopy, and found out to have 9 mass % of an acrylonitrile unit and 91 mass % of a styrene unit. In addition, the melt flow rate of the styrene-acrylonitrile resin was 78 g/10 min (according to ASTM D 1238, measured at 220° C. and at a load of 10 kg).

(Elastomer 1) Used was a styrene-based thermoplastic elastomer having a structure of styrene block-hydrogenated butadiene block-styrene block and a hydrogenation rate of the butadiene block portion of 99.9% and having bound styrene content of 33%, a number average molecular weight Mn of 246,000 and a ratio of weight average molecular weight/number average molecular weight (Mw/Mn) of 1.07 (hereinafter, sometimes also referred to as "elastomer 1").

(Elastomer 2) Used was a styrene-based thermoplastic elastomer having a structure of styrene block-hydrogenated butadiene block-styrene block and a hydrogenation rate of the butadiene block portion of 99.9% and having bound styrene content of 60%, a number average molecular weight Mn of 83,800 and a ratio of weight average molecular weight/number average molecular weight (Mw/Mn) of 1.20 (hereinafter, sometimes also referred to as "elastomer 2").

(PC-1) An aromatic polycarbonate resin having a MFR (test conditions: ISO1133, measured at 300° C. and at a load of 1.2 kg) of 10 g/10 min, produced by a melt transesterification method, (Wonderlite PC-110 (registered trademark), produced by Chimei-Asahi Corporation) was used (hereinafter, sometimes also referred to as "PC-1").

(PC-2) An aromatic polycarbonate resin having a MFR (test conditions: ISO1133, measured at 300° C. and at a load of 1.2 kg) of 22 g/10 min, produced by a melt transesterification method, (Wonderlite PC-122 (registered trademark), produced by Chimei-Asahi Corporation) was used (hereinafter, sometimes also referred to as "PC-2").

(PC-3) A polycarbonate resin having a MFR (test conditions: ISO1133, measured at 300° C. and at a load of 1.2 kg) of 1.1 g/10 min and having about 41% of a bisphenol structure having a cyclohexane ring introduced in a molecular skeleton thereof (APEC1800 (registered trademark), produced by Bayer AG) was used (hereinafter, sometimes also referred to as "PC-3").

(PC-4) An aromatic polycarbonate resin having a MFR (test conditions: ISO1133, measured at 300° C. and at a load of 1.2 kg) of 10 g/10 min, produced by a phosgene method, (Panlite L-1225Y (registered trademark), produced by Teijin Chemicals Ltd.) was used (hereinafter, sometimes also referred to as "PC-4").

<Heat Stabilizer Component (C)>

(C-1) Hindered Phenol-Based Heat Stabilizer Having Melting Point of 242° C.

3,3',3",5,5',5"-Hexa-tert-butyl-a,a',a"-(mesitylene-2,4,6-triyl)tri-p-cresol (chemical name) (trade name: Irganox 1330 (registered trademark), produced by BASF) was used (hereinafter, sometimes also referred to as "C-1").

(C-2) Hindered Phenol-Based Heat Stabilizer Having Melting Point of 221° C.

1,3,5-Tris(3,5-di-tert-butyl-4-hydroxybenzyl)-1,3,5-triazine-2,4,6(1H,3H,5H)-trione (chemical name) (trade name: Irganox 3114 (registered trademark), produced by BASF) was used (hereinafter, sometimes also referred to as "C-2").

(C-3) Phosphorus-Based Heat Stabilizer Having Melting Point of 184° C.

Tris(2,4-di-tert-butylphenyl)phosphite (chemical name) (trade name: Irgafos 168 (registered trademark), produced by BASF) was used (hereinafter, sometimes also referred to as "C-3").

(C-4) Hindered Phenol-Based Heat Stabilizer Having Melting Point of 158° C.

N,N'-hexane-1,6-diylbis[3-(3,5-di-tert-butyl-4-hydroxyphenyl)propionamide] (chemical name) (trade name: Irganox 1098 (registered trademark), produced by BASF) was used (hereinafter, sometimes also referred to as "C-4").

(C-5) Hindered Amine-Based Heat Stabilizer Having Melting Point of 156° C.

N,N'-bis(2,2,6,6-tetramethyl-4-piperidyl)N,N'-diformyl-hexamethylenediamine (chemical name) (trade name: Uvinil 4050FF (registered trademark), produced by BASF) was used (hereinafter, sometimes also referred to as "C-5").

(C-6) Hindered Amine-Based Heat Stabilizer Having Melting Point of 133° C.

A polycondensate (trade name: Chimassorb 2020 (registered trademark), produced by BASF) of dibutylamine-1,3,5-triazine-N,N'-bis(2,2,6,6-tetramethyl-4-piperidyl)-1,6-hexamethylenediamine and N-(2,2,6,6-tetramethyl-4-piperidyl)butylamine (chemical names) was used (hereinafter, sometimes also referred to as "C-6").

(C-7) Hindered Amine-Based Heat Stabilizer Having Melting Point of 118° C.

Pentaerythritol tetrekis[3-(3,5-di-tert-butyl-4-hydroxyphenyl)propionate] (chemical name) (trade name: Irganox 1010 (registered trademark), produced by BASF) was used (hereinafter, sometimes also referred to as "C-7").

(C-8) Hindered Phenol-Based Heat Stabilizer Having Melting Point of 52° C.

Octadecyl-3-(3,5-di-tert-butyl-4-hydroxyphenyl)propionate (chemical name) (trade name: Irganox 1076 (registered trademark), produced by BASF) was used (hereinafter, sometimes also referred to as "C-8").

(C-9) Hindered Phenol-Based Heat Stabilizer Having Melting Point of 94° C.

2,6-Di-tert-butyl-4-(4,6-bis(octylthio)-1,3,5-triazine-2-ylamino)phenol (chemical name) (trade name: Irganox 565 (registered trademark), produced by BASF) was used (hereinafter, sometimes also referred to as "C-9").

(C-10) Hindered Phenol-Based Heat Stabilizer Having Melting Point of 14° C.

4,6-Bis(octylthiomethyl)-O-cresol (chemical name) (trade name: Irganox 1520 (registered trademark), produced by BASF) was used (hereinafter, sometimes also referred to as "C-10").

(C-11) Sulfur-Based Heat Stabilizer Having Melting Point of 65° C.

Dioctadecyl 3,3'-thiodipropionate (chemical name) (trade name: Irganox PS802 (registered trademark), produced by BASF) was used (hereinafter, sometimes also referred to as "C-11").

(C-12) Phosphorus-Based Heat Stabilizer Having Melting Point of 235° C.

3,9-Bis(2,6-di-tert-butyl-4-methylphenoxy)-2,4,8,10-tetraoxa-3,9-diphosphaspiro[5,5]undecane (chemical name) (trade name: Adekastab PEP-36 (registered trademark), produced by Adeka Corporation) was used (hereinafter, sometimes also referred to as "C-12").

(C-13) Phosphorus-Based Heat Stabilizer Having Melting Point of 225° C.

Bis(2,4-dicumylphenyl)pentaerythritol diphosphite (chemical name) (trade name: DoverPhos S-9228 (registered trademark), produced by Dover Chemical Corporation) was used (hereinafter, sometimes also referred to as "C-13").

Herein, the melting point of each of the heat stabilizers was measured by a melting point measurement apparatus Model: B-545 (manufactured by Sibata Scientific Technology Ltd.).

Example 1

Eighty parts by mass of PPE-2 and 20 parts by mass of GPPS were supplied from the most upstream (top feed) of a ZSK 25 twin screw extruder manufactured by Werner & Pfleiderer in Germany, having a number of barrels of 10, a screw diameter of 25 mm and a ratio of L/D of 44 (screw pattern having 2 kneading discs L, 6 kneading discs R and 2 kneading discs N), and melt-kneaded at a cylinder temperature of 300° C., a screw rotation speed of 250 rpm and a vent vacuum degree of 7.998 kPa (60 Torr) to obtain a resin composition. The measurement results of physical properties of the obtained resin composition are shown in the following Table 1.

Example 2

Eighty parts by mass of PPE-2, 10 parts by mass of GPPS and 10 parts by mass of AS were melt-kneaded in the same manner as in Example 1 to obtain a resin composition. The measurement results of physical properties of the obtained resin composition are shown in the following Table 1.

Comparative Example 1

One hundred parts by mass of PPE-4 was melt-kneaded in the same manner as in Example 1 to obtain a resin composition. The measurement results of physical properties of the obtained resin composition are shown in the following Table 1.

Example 3

Eighty parts by mass of PPE-4 and 20 parts by mass of GPPS were melt-kneaded in the same manner as in Example 1 to obtain a resin composition. The measurement results of physical properties of the obtained resin composition are shown in the following Table 1.

Example 4

Eighty parts by mass of PPE-2, 20 parts by mass of GPPS, 5 parts by mass of polyamide 6 (trade name: 1013 B (registered trademark), produced by Ube Industries Ltd., hereinafter, also designated as "PA") and 3 parts by mass of elastomer 1 were melt-kneaded in the same manner as in Example 1 to obtain a resin composition. The measurement results of physical properties of the obtained resin composition are shown in the following Table 1.

Example 5

Except for replacing the polyamide 6 in Example 4 with 5 parts by mass of polypropylene (trade name: Novatec PPSA08 (registered trademark), produced Japan Polypropylene Corporation, hereinafter, also designated as "PP"), the components were melt-kneaded in the same manner as in Example 4 to obtain a resin composition. The measurement results of physical properties of the obtained resin composition are shown in the following Table 1.

Example 6

Eighty parts by mass of PPE-2, 20 parts by mass of GPPS and 5 parts by mass of a rubber-reinforced polystyrene (trade name: H9405 (registered trademark), produced by Asahi Kasei Chemicals Corporation) were melt-kneaded in the same manner as in Example 1 to obtain a resin composition. The measurement results of physical properties of the obtained resin composition are shown in the following Table 1.

Example 7

Sixty parts by mass of PPE-2, 40 parts by mass of GPPS and 5 parts by mass of elastomer 1 were melt-kneaded in the same manner as in Example 1 to obtain a resin composition. The measurement results of physical properties of the obtained resin composition are shown in the following Table 1.

Example 8

Sixty parts by mass of PPE-1, 40 parts by mass of GPPS, 2 parts by mass of elastomer 1 and 3 parts by mass of elastomer 2 were melt-kneaded in the same manner as in Example 1 to obtain a resin composition. The measurement results of physical properties of the obtained resin composition are shown in the following Table 1.

Example 9

Sixty parts by mass of PPE-2, 40 parts by mass of GPPS, 2 parts by mass of elastomer 1 and 3 parts by mass of elastomer 2 were melt-kneaded in the same manner as in Example 1 to obtain a resin composition. The measurement results of physical properties of the obtained resin composition are shown in the following Table 1.

Example 10

Sixty parts by mass of PPE-2, 40 parts by mass of GPPS, 1 part by mass of elastomer 1 and 4 parts by mass of elastomer 2 were melt-kneaded in the same manner as in Example 1 to obtain a resin composition. The measurement results of physical properties of the obtained resin composition are shown in the following Table 1.

Example 11

Sixty parts by mass of PPE-2, 40 parts by mass of GPPS, 4 parts by mass of elastomer 1 and 1 part by mass of elastomer 2 were melt-kneaded in the same manner as in Example 1 to obtain a resin composition. The measurement results of physical properties of the obtained resin composition are shown in the following Table 1.

Example 12

Sixty parts by mass of PPE-2, 40 parts by mass of GPPS and 5 parts by mass of elastomer 2 were melt-kneaded in the same manner as in Example 1 to obtain a resin composition. The measurement results of physical properties of the obtained resin composition are shown in the following Table 1.

Comparative Example 2

Fifty parts by mass of PPE-2, 25 parts by mass of GPPS, 25 parts by mass of AS, 2 parts by mass of elastomer 1 and 3 parts by mass of elastomer 2 were melt-kneaded in the same manner as in Example 1 to obtain a resin composition. The measurement results of physical properties of the obtained resin composition are shown in the following Table 1.

Example 13

Ninety parts by mass of PPE-2, 5 parts by mass of GPPS, 5 parts by mass of AS, 2 parts by mass of elastomer 1 and 2 parts by mass of elastomer 2 were melt-kneaded in the same manner as in Example 1 to obtain a resin composition. The measurement results of physical properties of the obtained resin composition are shown in the following Table 1.

Example 14

Ninety parts by mass of PPE-4, 5 parts by mass of GPPS, 5 parts by mass of AS, 2 parts by mass of elastomer 1 and 2 parts by mass of elastomer 2 were melt-kneaded in the same manner as in Example 1 to obtain a resin composition. The measurement results of physical properties of the obtained resin composition are shown in the following Table 1.

Example 15

Sixty parts by mass of PPE-4, 32 parts by mass of GPPS, 2 parts by mass of elastomer 1 and 6 parts by mass of elastomer 2 were melt-kneaded in the same manner as in Example 1 to obtain a resin composition. The measurement results of physical properties of the obtained resin composition are shown in the following Table 2.

Example 16

Sixty parts by mass of PPE-4, 32 parts by mass of AS, 2 parts by mass of elastomer 1 and 6 parts by mass of elastomer 2 were melt-kneaded in the same manner as in Example 1 to obtain a resin composition. The measurement results of physical properties of the obtained resin composition are shown in the following Table 2.

Example 17

Sixty parts by mass of PPE-4, 31.5 parts by mass of GPPS, 2 parts by mass of elastomer 1, 6 parts by mass of elastomer 2 and 0.5 parts by mass of C-1 were melt-kneaded in the same manner as in Example 1 to obtain a resin composition. The measurement results of physical properties of the obtained resin composition are shown in the following Table 2.

Example 18

Sixty parts by mass of PPE-4, 31 parts by mass of GPPS, 2 parts by mass of elastomer 1, 6 parts by mass of elastomer 2 and 1 part by mass of C-1 were melt-kneaded in the same manner as in Example 1 to obtain a resin composition. The measurement results of physical properties of the obtained resin composition are shown in the following Table 2.

Example 19

Sixty parts by mass of PPE-4, 21 parts by mass of GPPS, 10 parts by mass of AS, 2 parts by mass of elastomer 1, 6 parts by mass of elastomer 2 and 1 part by mass of C-1 were melt-kneaded in the same manner as in Example 1 to obtain a resin composition. The measurement results of physical properties of the obtained resin composition are shown in the following Table 2.

Example 20

Sixty parts by mass of PPE-4, 30 parts by mass of GPPS, 2 parts by mass of elastomer 1, 6 parts by mass of elastomer 2 and 2 parts by mass of C-1 were melt-kneaded in the same manner as in Example 1 to obtain a resin composition. The measurement results of physical properties of the obtained resin composition are shown in the following Table 2.

Example 21

Ninety five parts by mass of PPE-5, 3 parts by mass of elastomer 1 and 2 parts by mass of elastomer 2 were melt-kneaded in the same manner as in Example 1 to obtain a resin composition. The measurement results of physical properties of the obtained resin composition are shown in the following Table 2.

Example 22

Ninety four parts by mass of PPE-5, 3 parts by mass of elastomer 1, 2 parts by mass of elastomer 2 and 1 part by mass of C-1 were melt-kneaded in the same manner as in Example 1 to obtain a resin composition. The measurement results of physical properties of the obtained resin composition are shown in the following Table 2.

Reference Example 1

Ninety four parts by mass of PPE-6, 3 parts by mass of elastomer 1, 2 parts by mass of elastomer 2 and 1 part by mass of C-1 were melt-kneaded in the same manner as in Example 1 to obtain a resin composition. The obtained resin composition was tried to be molded, but could not be molded because the molded article to be obtained was brittle to result in cracking and plugging of a sprue bush. Therefore, no measurement results of physical properties were obtained.

Example 23

Seventy parts by mass of PPE-4, 21 parts by mass of GPPS, 2 parts by mass of elastomer 1, 6 parts by mass of elastomer 2 and 1 part by mass of C-2 were melt-kneaded in the same manner as in Example 1 to obtain a resin composition. The measurement results of physical properties of the obtained resin composition are shown in the following Table 2.

Example 24

Except for replacing C-2 with C-3, the components were melt-kneaded in the same manner as in Example 23 to obtain a resin composition. The measurement results of physical properties of the obtained resin composition are shown in the following Table 2.

Example 25

Except for replacing C-2 with C-4, the components were melt-kneaded in the same manner as in Example 23 to obtain a resin composition. The measurement results of physical properties of the obtained resin composition are shown in the following Table 2.

Example 26

Except for replacing C-2 with C-5, the components were melt-kneaded in the same manner as in Example 23 to obtain a resin composition. The measurement results of physical properties of the obtained resin composition are shown in the following Table 2.

Example 27

Except for replacing C-2 with C-6, the components were melt-kneaded in the same manner as in Example 23 to obtain a resin composition. The measurement results of physical properties of the obtained resin composition are shown in the following Table 2.

Example 28

Except for replacing C-2 with C-7, the components were melt-kneaded in the same manner as in Example 23 to obtain a resin composition. The measurement results of physical properties of the obtained resin composition are shown in the following Table 2.

Example 29

Except for replacing C-2 with C-9, the components were melt-kneaded in the same manner as in Example 23 to obtain a resin composition. The measurement results of physical properties of the obtained resin composition are shown in the following Table 2.

Example 30

Except for replacing C-2 with C-11, the components were melt-kneaded in the same manner as in Example 23 to obtain a resin composition. The measurement results of physical properties of the obtained resin composition are shown in the following Table 2.

Example 31

Eighty parts by mass of PPE-5, 7 parts by mass of GPPS, 7 parts by mass of AS, 1 part by mass of elastomer 1, 4 parts by mass of elastomer 2, 0.5 parts by mass of C-3 and 0.5 parts by mass of C-7 were melt-kneaded in the same manner as in Example 1 to obtain a resin composition. The measurement results of physical properties of the obtained resin composition are shown in the following Table 2.

Example 32

Eighty parts by mass of PPE-5, 6 parts by mass of GPPS, 7 parts by mass of AS, 1 part by mass of elastomer 1, 4 parts by mass of elastomer 2, 1 part by mass of C-5 and 1 part by mass of C-7 were melt-kneaded in the same manner as in Example 1 to obtain a resin composition. The measurement results of physical properties of the obtained resin composition are shown in the following Table 2.

Example 33

Eighty parts by mass of PPE-5, 6 parts by mass of GPPS, 7 parts by mass of AS, 1 part by mass of elastomer 1, 4 parts by mass of elastomer 2, 1 part by mass of C-8 and 1 part by mass of C-10 were melt-kneaded in the same manner as in Example 1 to obtain a resin composition. The measurement results of physical properties of the obtained resin composition are shown in the following Table 2.

Comparative Example 3

The measurement results of physical properties of PC-3 are shown in the following Table 3.

Example 34

Eighty five parts by mass of PPE-2, 10.5 parts by mass of GPPS, 2 parts by mass of elastomer 1 and 2.5 parts by mass of elastomer 2 were melt-kneaded in the same manner as in Example 1 to obtain a resin composition. The measurement results of physical properties of the obtained resin composition are shown in the following Table 3.

Example 35

Eighty five parts by mass of PPE-2, 2 parts by mass of elastomer 1, 2.5 parts by mass of elastomer 2 and 10.5 parts by mass of PC-1 were melt-kneaded in the same manner as in Example 1 to obtain a resin composition. The measurement results of physical properties of the obtained resin composition are shown in the following Table 3.

Example 36

Except for replacing PC-1 with PC-3, the components were melt-kneaded in the same manner as in Example 35 to obtain a resin composition. The measurement results of physical properties of the obtained resin composition are shown in the following Table 3.

Example 37

Seventy five parts by mass of PPE-2, 10.5 parts by mass of GPPS, 10 parts by mass of AS, 2 parts by mass of elastomer 1 and 2.5 parts by mass of elastomer 2 were melt-kneaded in the same manner as in Example 1 to obtain a resin composition. The measurement results of physical properties of the obtained resin composition are shown in the following Table 3.

Example 38

Seventy five parts by mass of PPE-2, 10.5 parts by mass of AS, 2 parts by mass of elastomer 1, 2.5 parts by mass of elastomer 2 and 10 parts by mass of PC-4 were melt-kneaded in the same manner as in Example 1 to obtain a resin composition. The measurement results of physical properties of the obtained resin composition are shown in the following Table 3.

Example 39

Except for replacing PC-4 with PC-3, the components were melt-kneaded in the same manner as in Example 38 to obtain a resin composition. The measurement results of physical properties of the obtained resin composition are shown in the following Table 3.

Example 40

Seventy five parts by mass of PPE-2, 10.5 parts by mass of GPPS, 2 parts by mass of elastomer 1, 2.5 parts by mass of elastomer 2 and 10 parts by mass of PC-1 were melt-kneaded in the same manner as in Example 1 to obtain a resin composition. The measurement results of physical properties of the obtained resin composition are shown in the following Table 3.

Example 41

Except for replacing GPPS with AS, the components were melt-kneaded in the same manner as in Example 40 to obtain a resin composition. The measurement results of physical properties of the obtained resin composition are shown in the following Table 3.

Example 42

Eighty parts by mass of PPE-2, 10.5 parts by mass of AS, 2 parts by mass of elastomer 1, 2.5 parts by mass of elastomer 2 and 5 parts by mass of PC-3 were melt-kneaded in the same manner as in Example 1 to obtain a resin composition. The measurement results of physical properties of the obtained resin composition are shown in the following Table 3.

Example 43

Seventy five parts by mass of PPE-4 and 25 parts by mass of PC-1 were melt-kneaded in the same manner as in Example 1 to obtain a resin composition. The measurement results of physical properties of the obtained resin composition are shown in the following Table 4.

Example 44

Sixty parts by mass of PPE-4 and 40 parts by mass of PC-1 were melt-kneaded in the same manner as in Example 1 to obtain a resin composition. The measurement results of physical properties of the obtained resin composition are shown in the following Table 4.

Example 45

One hundred parts by mass of PPE-4 and 30 parts by mass of PC-2 were melt-kneaded in the same manner as in Example 1 to obtain a resin composition. The measurement results of physical properties of the obtained resin composition are shown in the following Table 4.

Comparative Example 4

Fifty parts by mass of PPE-4 and 50 parts by mass of PC-1 were melt-kneaded in the same manner as in Example 1 to obtain a resin composition. The measurement results of physical properties of the obtained resin composition are shown in the following Table 4.

Example 46

Eighty four parts by mass of PPE-4, 3 parts by mass of elastomer 1, 3 parts by mass of elastomer 2 and 10 parts by mass of PC-1 were melt-kneaded in the same manner as in Example 1 to obtain a resin composition. The measurement results of physical properties of the obtained resin composition are shown in the following Table 4.

Example 47

Eighty four parts by mass of PPE-4, 2 parts by mass of AS, 3 parts by mass of elastomer 1, 3 parts by mass of elastomer 2 and 8 parts by mass of PC-1 were melt-kneaded in the same manner as in Example 1 to obtain a resin composition. The measurement results of physical properties of the obtained resin composition are shown in the following Table 4.

Example 48

Eighty four parts by mass of PPE-4, 6 parts by mass of AS, 3 parts by mass of elastomer 1, 3 parts by mass of elastomer 2 and 4 parts by mass of PC-1 were melt-kneaded in the same manner as in Example 1 to obtain a resin composition. The measurement results of physical properties of the obtained resin composition are shown in the following Table 4.

Example 49

Eighty three parts by mass of PPE-4, 3 parts by mass of elastomer 1, 3 parts by mass of elastomer 2, 1 part by mass of C-1 and 10 parts by mass of PC-1 were melt-kneaded in the same manner as in Example 1 to obtain a resin composition. The measurement results of physical properties of the obtained resin composition are shown in the following Table 4.

Example 50

Eighty four parts by mass of PPE-5, 3 parts by mass of elastomer 1, 3 parts by mass of elastomer 2 and 10 parts by mass of PC-2 were melt-kneaded in the same manner as in Example 1 to obtain a resin composition. The measurement results of physical properties of the obtained resin composition are shown in the following Table 4.

Example 51

Eighty three parts by mass of PPE-5, 3 parts by mass of elastomer 1, 3 parts by mass of elastomer 2, 1 part by mass of C-1 and 10 parts by mass of PC-2 were melt-kneaded in the same manner as in Example 1 to obtain a resin composition. The measurement results of physical properties of the obtained resin composition are shown in the following Table 4.

Example 52

Seventy parts by mass of PPE-4, 9 parts by mass of AS, 3 parts by mass of elastomer 1, 3 parts by mass of elastomer 2 and 15 parts by mass of PC-1 were melt-kneaded in the same manner as in Example 1 to obtain a resin composition. The measurement results of physical properties of the obtained resin composition are shown in the following Table 4.

Example 53

One hundred parts by mass of PPE-4, 3 parts by mass of elastomer 1, 3 parts by mass of elastomer 2 and 30 parts by mass of PC-1 were melt-kneaded in the same manner as in Example 1 to obtain a resin composition. The measurement results of physical properties of the obtained resin composition are shown in the following Table 4.

Example 54

Seventy parts by mass of PPE-4, 8 parts by mass of AS, 3 parts by mass of elastomer 1, 3 parts by mass of elastomer 2, 1 part by mass of C-1 and 15 parts by mass of PC-1 were melt-kneaded in the same manner as in Example 1 to obtain a resin composition. The measurement results of physical properties of the obtained resin composition are shown in the following Table 4.

Example 55

Sixty five parts by mass of PPE-4, 13 parts by mass of AS, 3 parts by mass of elastomer 1, 3 parts by mass of elastomer 2, 1 part by mass of C-1 and 15 parts by mass of PC-1 were melt-kneaded in the same manner as in Example 1 to obtain a resin composition. The measurement results of physical properties of the obtained resin composition are shown in the following Table 4.

Example 56

Seventy five parts by mass of PPE-4, 10 parts by mass of AS, 2 parts by mass of elastomer 1, 2 parts by mass of elastomer 2, 1 part by mass of C-1 and 10 parts by mass of PC-1 were melt-kneaded in the same manner as in Example 1 to obtain a resin composition. The measurement results of physical properties of the obtained resin composition are shown in the following Table 4.

Example 57

Seventy five parts by mass of PPE-4, 10.75 parts by mass of AS, 2 parts by mass of elastomer 1, 2 parts by mass of elastomer 2, 0.25 parts by mass of C-3 and 10 parts by mass of PC-1 were melt-kneaded in the same manner as in Example 1 to obtain a resin composition. The measurement results of physical properties of the obtained resin composition are shown in the following Table 4.

Example 58

Seventy five parts by mass of PPE-4, 10.5 parts by mass of AS, 2 parts by mass of elastomer 1, 2 parts by mass of elastomer 2, 0.5 parts by mass of C-3 and 10 parts by mass of PC-1 were melt-kneaded in the same manner as in Example 1 to obtain a resin composition. The measurement results of physical properties of the obtained resin composition are shown in the following Table 4.

Example 59

Seventy five parts by mass of PPE-4, 10.5 parts by mass of AS, 2 parts by mass of elastomer 1, 2 parts by mass of elastomer 2, 0.5 parts by mass of C-12 and 10 parts by mass of PC-1 were melt-kneaded in the same manner as in Example 1 to obtain a resin composition. The measurement results of physical properties of the obtained resin composition are shown in the following Table 4.

Example 60

Seventy five parts by mass of PPE-4, 10.5 parts by mass of AS, 2 parts by mass of elastomer 1, 2 parts by mass of elastomer 2, 0.5 parts by mass of C-13 and 10 parts by mass of PC-1 were melt-kneaded in the same manner as in Example 1 to obtain a resin composition. The measurement results of physical properties of the obtained resin composition are shown in the following Table 4.

TABLE 1

|  |  | Example 1 | Example 2 | Comparative Example 1 | Example 3 | Example 4 | Example 5 |
|---|---|---|---|---|---|---|---|
| (Formulation) parts by mass | | | | | | | |
| PPE-1 | η = 0.48 | | | | | | |
| PPE-2 | η = 0.40 | 80 | 80 | | | 80 | 80 |
| PPE-3 | η = 0.35 | | | | | | |
| PPE-4 | η = 0.30 | | | 100 | 80 | | |
| PPE-5 | η = 0.25 | | | | | | |
| GPPS | 680 | 20 | 10 | | 20 | 20 | 20 |
| AS | | | 10 | | | | |
| PA (Crystalline resin) 1013B | | | | | | 5 | |
| PP (Crystalline resin) SA08 | | | | | | | 5 |
| HIPS (Rubber-reinforced polystyrene) H9405 | | | | | | | |
| Elastomer 1 | Bo-St % = 33% | | | | | 3 | 3 |
| Elastomer 2 | Bo-St % = 60% | | | | | | |
| Total | | 100 | 100 | 100 | 100 | 108 | 108 |
| (Physical properties) | | | | | | | |
| Specific gravity | | 1.06 | 1.06 | 1.08 | 1.06 | 1.07 | 1.06 |
| Vicat softening point ° C. | | 178 | 181 | 210 | 175 | 169 | 166 |
| MFR (280° C./10 kg) g/10 min | | 18.6 | 19.5 | 11.2 | 55.7 | 27.8 | 24.4 |
| IZOD kJ/m2 | | 1.1 | 1.8 | 1.1 | 0.5 | 6.8 | 5.7 |
| Gloss value (gloss: measurement angle 20°) % | | 108 | 121 | 105 | 114 | 35 | 21 |
| Peeling (SFD high speed injection molded piece) | | Good | Good | Good | Good | Poor | Poor |
| Brightness feeling of molded article (after heat aging at 150° C.) | | Good | Good | Fogging | Good | Fogging | Fogging |
| Number of white spots (craters 30 μm or more in diameter) | | 50 | 38 | 104 | 49 | — | — |
| Appearance of aluminum vapor-deposited plate (visually determined) | | Poor | Fair | Poor | Poor | Poor | Poor |

TABLE 1-continued

|  |  | Example 6 | Example 7 | Example 8 | Example 9 | Example 10 |
|---|---|---|---|---|---|---|
| (Formulation) parts by mass |  |  |  |  |  |  |
| PPE-1 | η = 0.48 |  |  | 60 |  |  |
| PPE-2 | η = 0.40 | 80 | 60 |  | 60 | 60 |
| PPE-3 | η = 0.35 |  |  |  |  |  |
| PPE-4 | η = 0.30 |  |  |  |  |  |
| PPE-5 | η = 0.25 |  |  |  |  |  |
| GPPS | 680 | 20 | 40 | 40 | 40 | 40 |
| AS |  |  |  |  |  |  |
| PA (Crystalline resin) 1013B |  |  |  |  |  |  |
| PP (Crystalline resin) SA08 |  |  |  |  |  |  |
| HIPS (Rubber-reinforced polystyrene) H9405 |  | 5 |  |  |  |  |
| Elastomer 1 | Bo-St % = 33% |  | 5 | 2 | 2 | 1 |
| Elastomer 2 | Bo-St % = 60% |  |  | 3 | 3 | 4 |
| Total |  | 105 | 105 | 105 | 105 | 105 |
| (Physical properties) |  |  |  |  |  |  |
| Specific gravity |  | 1.06 | 1.05 | 1.05 | 1.05 | 1.05 |
| Vicat softening point° C. |  | 171 | 153 | 155 | 154 | 155 |
| MFR (280° C./10 kg) g/10 min |  | 22.7 | 52.6 | 17.6 | 51.0 | 49.6 |
| IZOD kJ/m2 |  | 1.4 | 9.1 | 9.6 | 8.7 | 11.6 |
| Gloss value (gloss: measurement angle 20°) % |  | 27 | 105 | 78 | 126 | 128 |
| Peeling (SFD high speed injection molded piece) |  | Good | Poor | Good | Good | Good |
| Brightness feeling of molded article (after heat aging at 150° C.) |  | Fogging | Good | Fogging | Good | Good |
| Number of white spots (craters 30 μm or more in diameter) |  | — | 46 | 128 | 48 | 55 |
| Appearance of aluminum vapor-deposited plate (visually determined) |  | Poor | Poor | Poor | Poor | Poor |

|  |  | Example 11 | Example 12 | Comparative Example 2 | Example 13 | Example 14 |
|---|---|---|---|---|---|---|
| (Formulation) parts by mass |  |  |  |  |  |  |
| PPE-1 | η = 0.48 |  |  |  |  |  |
| PPE-2 | η = 0.40 | 60 | 60 | 50 | 90 |  |
| PPE-3 | η = 0.35 |  |  |  |  |  |
| PPE-4 | η = 0.30 |  |  |  |  | 90 |
| PPE-5 | η = 0.25 |  |  |  |  |  |
| GPPS | 680 | 40 | 40 | 25 | 5 | 5 |
| AS |  |  |  | 25 | 5 | 5 |
| PA (Crystalline resin) 1013B |  |  |  |  |  |  |
| PP (Crystalline resin) SA08 |  |  |  |  |  |  |
| HIPS (Rubber-reinforced polystyrene) H9405 |  |  |  |  |  |  |
| Elastomer 1 | Bo-St % = 33% | 4 |  | 2 | 2 | 2 |
| Elastomer 2 | Bo-St % = 60% | 1 | 5 | 3 | 2 | 2 |
| Total |  | 105 | 105 | 105 | 104 | 104 |
| (Physical properties) |  |  |  |  |  |  |
| Specific gravity |  | 1.05 | 1.05 | 1.04 | 1.07 | 1.07 |
| Vicat softening point ° C. |  | 156 | 157 | 141 | 189 | 188 |
| MFR (280° C./10 kg) g/10 min |  | 52.5 | 54.5 | 87.9 | 10.2 | 25.2 |
| IZOD kJ/m2 |  | 6.2 | 2.6 | 1.2 | 9.2 | 8.3 |
| Gloss value (gloss: measurement angle 20°) % |  | 107 | 105 | 125 | 113 | 111 |
| Peeling (SFD high speed injection molded piece) |  | Good | Good | Good | Good | Good |
| Brightness feeling of molded article (after heat aging at 150° C.) |  | Good | Good | Good | Good | Good |
| Number of white spots (craters 30 μm or more in diameter) |  | 53 | 40 | 36 | 40 | 39 |
| Appearance of aluminum vapor-deposited plate (visually determined) |  | Poor | Fair | Fair | Fair | Fair |

As shown in Table 1, since all the molded bodies made of the resin compositions of Comparative Example 1 and Comparative Example 2 had the content of the polyphenylene ether (A) not falling within the range of the resin composition for use in the present embodiment, the molding made of the resin composition of Comparative Example 1 had fogging on the surface of the molding and insufficient brightness feeling of the molding after heat aging, and the molding made of the resin composition of Comparative Example 2 had an insufficient Vicat softening temperature as an index of heat resistance.

Since the molded bodies made of the resin compositions of Examples 4 and 5 had a crystalline polymer formulated in each resin composition, they did not necessarily achieve satisfactory results in terms of gloss value of the molding, brightness feeling after heat aging, and peeling property of the molding.

Since the molding made of the resin composition of Example 6 had a rubber-reinforced polystyrene formulated in the resin composition, it did not necessarily achieve satisfactory results in terms of gloss value of the molding and brightness feeling after heat aging.

Since the molding made of the resin composition of Example 7 had a styrene-based thermoplastic elastomer (B2-2) having a low amount of bound styrene (33%) alone formulated in the resin composition, it did not necessarily achieve a satisfactory result in terms of peeling property of the molding because peeling was caused in the SFD high speed injection molded piece.

Since the molding made of the resin composition of Example 8 had the polyphenylene ether (A) used whose reduced viscosity was relatively high ($\eta_{sp/c}$: 0.48 dl/g), it did not necessarily achieve a satisfactory result in terms of brightness feeling after heat aging.

While other molded bodies made of the resin compositions of Examples 1 to 3 and Examples 9 to 14 did not necessarily achieve satisfactory results in terms of white spots and appearance of the aluminum vapor-deposited plate, they had a low specific gravity and were good in gloss of the molding and brightness feeling after heat aging in addition to heat resistance (Vicat softening temperature) and fluidity (MFR), and thus were found to be suitably usable for automotive lamp extension molded bodies.

TABLE 2

| | | Melting point (° C.) | Example 15 | Example 16 | Example 17 | Example 18 | Example 19 |
|---|---|---|---|---|---|---|---|
| (Formulation) parts by mass | | | | | | | |
| PPE(I-1) | $\eta = 0.50$ | | | | | | |
| PPE-4 | $\eta = 0.30$ | | 60 | 60 | 60 | 60 | 60 |
| PPE-5 | $\eta = 0.25$ | | | | | | |
| PPE-6 | $\eta = 0.22$ | | | | | | |
| GPPS | | 680 | 32 | | 31.5 | 31 | 21 |
| AS | | | | 32 | | | 10 |
| Elastomer 1 | | | 2 | 2 | 2 | 2 | 2 |
| Elastomer 2 | | | 6 | 6 | 6 | 6 | 6 |
| Iraganox 1330(C-1) Hindered phenol-based | | 243 | | | 0.5 | 1 | 1 |
| Iraganox 3114(C-2) Hindered phenol-based | | 221 | | | | | |
| Iragafos 168(C-3) Phosphorus-based | | 184 | | | | | |
| Iraganox 1098(C-4) Hindered phenol-based | | 158 | | | | | |
| Uvinil 4050FF(C-5) Hindered amine-based | | 156 | | | | | |
| Chimassorb 2020(C-6) Hindered amine-based | | 133 | | | | | |
| Irganox 1010(C-7) Hindered phenol-based | | 118 | | | | | |
| Iraganox 1076(C-8) Hindered phenol-based | | 52 | | | | | |
| Iraganox 565(C-9) S-containing hindered phenol | | 94 | | | | | |
| Iraganox 1520(C-10) S-containing hindered phenol | | 14 | | | | | |
| Iraganox PS 802(C-11) Sulfur-based | | 65 | | | | | |
| Total | | | 100 | 100 | 100 | 100 | 100 |
| (Physical properties) | | | | | | | |
| Specific gravity | | | 1.05 | 1.05 | 1.05 | 1.05 | 1.05 |
| Vicat softening point ° C. | | | 154 | 154 | 154 | 155 | 158 |
| MFR (280° C./10 kg) g/10 min | | | 85.8 | 99.6 | 88.2 | 90.0 | 97.2 |
| IZOD kJ/m2 | | | 5.2 | 6.8 | 5.2 | 5.5 | 6.4 |
| Gloss value (gloss: measurement angle 20°) % | | | 112 | 126 | 120 | 120 | 128 |
| Brightness feeling of molded article (after heat aging at 150° C.) | | | Good | Good | Good | Good | Good |
| Number of white spots (craters 30 μm or more in diameter) | | | 46 | 30 | 20 | 16 | 13 |
| Appearance of aluminum vapor-deposited plate (visually determined) | | | Poor | Fair | Good | Good | Good |

| | | Melting point (° C.) | Example 20 | Example 21 | Example 22 | Reference Example 1 | Example 23 |
|---|---|---|---|---|---|---|---|
| (Formulation) parts by mass | | | | | | | |
| PPE(I-1) | $\eta = 0.50$ | | 80 | | | | |
| PPE-4 | $\eta = 0.30$ | | 60 | | | | 70 |

TABLE 2-continued

|  |  |  |  |  |  |  |
|---|---|---|---|---|---|---|
| PPE-5 | η = 0.25 |  | 95 | 94 |  |  |
| PPE-6 | η = 0.22 |  |  |  | 94 |  |
| GPPS | 680 | 30 |  |  |  | 21 |
| AS |  |  |  |  |  |  |
| Elastomer 1 |  | 2 | 3 | 3 | 3 | 2 |
| Elastomer 2 |  | 6 | 2 | 2 | 2 | 6 |
| Iraganox 1330(C-1) | 243 | 2 |  | 1 | 1 |  |
| Hindered phenol-based |  |  |  |  |  |  |
| Iraganox 3114(C-2) | 221 |  |  |  |  | 1 |
| Hindered phenol-based |  |  |  |  |  |  |
| Iragafos 168(C-3) | 184 |  |  |  |  |  |
| Phosphorus-based |  |  |  |  |  |  |
| Iraganox 1098(C-4) | 158 |  |  |  |  |  |
| Hindered phenol-based |  |  |  |  |  |  |
| Uvinil 4050FF(C-5) | 156 |  |  |  |  |  |
| Hindered amine-based |  |  |  |  |  |  |
| Chimassorb 2020(C-6) | 133 |  |  |  |  |  |
| Hindered amine-based |  |  |  |  |  |  |
| Irganox 1010(C-7) | 118 |  |  |  |  |  |
| Hindered phenol-based |  |  |  |  |  |  |
| Iraganox 1076(C-8) | 52 |  |  |  |  |  |
| Hindered phenol-based |  |  |  |  |  |  |
| Iraganox 565(C-9) | 94 |  |  |  |  |  |
| S-containing hindered phenol |  |  |  |  |  |  |
| Iraganox 1520(C-10) | 14 |  |  |  |  |  |
| S-containing hindered phenol |  |  |  |  |  |  |
| Iraganox PS 802(C-11) | 65 |  |  |  |  |  |
| Sulfur-based |  |  |  |  |  |  |
| Total |  | 100 | 100 | 100 | 100 | 100 |
| (Physical properties) |  |  |  |  |  |  |
| Specific gravity |  | 1.05 | 1.07 | 1.07 | Unmoldable | 1.06 |
| Vicat softening point ° C. |  | 156 | 196 | 194 |  | 177 |
| MFR (280° C./10 kg) g/10 min |  | 88.2 | 112 | 114 |  | 61.2 |
| IZOD kJ/m2 |  | 5.5 | 6.6 | 6.7 |  | 6.9 |
| Gloss value (gloss: measurement angle 20°) % |  | 120 | 104 | 122 |  | 124 |
| Brightness feeling of molded article |  | Good | Good | Good |  | Good |
| (after heat aging at 150° C.) |  |  |  |  |  |  |
| Number of white spots |  | 16 | 42 | 16 |  | 18 |
| (craters 30 μm or more in diameter) |  |  |  |  |  |  |
| Appearance of aluminum vapor-deposited plate |  | Good | Fair | Good |  | Good |
| (visually determined) |  |  |  |  |  |  |

|  | Melting point (° C.) | Example 24 | Example 25 | Example 26 | Example 27 | Example 28 |
|---|---|---|---|---|---|---|
| (Formulation) parts by mass |  |  |  |  |  |  |
| PPE(I-1) | η = 0.50 |  |  |  |  |  |
| PPE-4 | η = 0.30 | 70 | 70 | 70 | 70 | 70 |
| PPE-5 | η = 0.25 |  |  |  |  |  |
| PPE-6 | η = 0.22 |  |  |  |  |  |
| GPPS | 680 | 21 | 21 | 21 | 21 | 21 |
| AS |  |  |  |  |  |  |
| Elastomer 1 |  | 2 | 2 | 2 | 2 | 2 |
| Elastomer 2 |  | 6 | 6 | 6 | 6 | 6 |
| Iraganox 1330(C-1) | 243 |  |  |  |  |  |
| Hindered phenol-based |  |  |  |  |  |  |
| Iraganox 3114(C-2) | 221 |  |  |  |  |  |
| Hindered phenol-based |  |  |  |  |  |  |
| Iragafos 168(C-3) | 184 | 1 |  |  |  |  |
| Phosphorus-based |  |  |  |  |  |  |
| Iraganox 1098(C-4) | 158 |  | 1 |  |  |  |
| Hindered phenol-based |  |  |  |  |  |  |
| Uvinil 4050FF(C-5) | 156 |  |  | 1 |  |  |
| Hindered amine-based |  |  |  |  |  |  |
| Chimassorb 2020(C-6) | 133 |  |  |  | 1 |  |
| Hindered amine-based |  |  |  |  |  |  |
| Irganox 1010(C-7) | 118 |  |  |  |  | 1 |
| Hindered phenol-based |  |  |  |  |  |  |
| Iraganox 1076(C-8) | 52 |  |  |  |  |  |
| Hindered phenol-based |  |  |  |  |  |  |
| Iraganox 565(C-9) | 94 |  |  |  |  |  |
| S-containing hindered phenol |  |  |  |  |  |  |
| Iraganox 1520(C-10) | 14 |  |  |  |  |  |

TABLE 2-continued

| | | | | | | |
|---|---|---|---|---|---|---|
| S-containing hindered phenol Iraganox PS 802(C-11) Sulfur-based | | 65 | | | | |
| Total | | 100 | 100 | 100 | 100 | 100 |
| (Physical properties) | | | | | | |
| Specific gravity | | 1.06 | 1.06 | 1.06 | 1.06 | 1.06 |
| Vicat softening point ° C. | | 179 | 177 | 173 | 173 | 173 |
| MFR (280° C./10 kg) g/10 min | | 61.8 | 72.6 | 80.4 | 78.6 | 61.2 |
| IZOD kJ/m2 | | 6.7 | 6.0 | 5.6 | 5.3 | 5.5 |
| Gloss value (gloss: measurement angle 20°) % | | 125 | 101 | 107 | 103 | 98 |
| Brightness feeling of molded article (after heat aging at 150° C.) | | Good | Good | Good | Good | Good |
| Number of white spots (craters 30 μm or more in diameter) | | 38 | 44 | 45 | 47 | 43 |
| Appearance of aluminum vapor-deposited plate (visually determined) | | Fair | Poor | Poor | Poor | Poor |

| | Melting point (° C.) | Example 29 | Example 30 | Example 31 | Example 32 | Example 33 |
|---|---|---|---|---|---|---|
| (Formulation) parts by mass | | | | | | |
| PPE(I-1) η = 0.50 | | | | | | |
| PPE-4 η = 0.30 | | 70 | 70 | | | |
| PPE-5 η = 0.25 | | | | 80 | 80 | 80 |
| PPE-6 η = 0.22 | | | | | | |
| GPPS | 680 | 21 | 21 | 7 | 6 | 6 |
| AS | | | | 7 | 7 | 7 |
| Elastomer 1 | | 2 | 2 | 1 | 1 | 1 |
| Elastomer 2 | | 6 | 6 | 4 | 4 | 4 |
| Iraganox 1330(C-1) Hindered phenol-based | 243 | | | | | |
| Iraganox 3114(C-2) Hindered phenol-based | 221 | | | | | |
| Iragafos 168(C-3) Phosphorus-based | 184 | | 0.5 | | | |
| Iraganox 1098(C-4) Hindered phenol-based | 158 | | | | | |
| Uvinil 4050FF(C-5) Hindered amine-based | 156 | | | | 1 | |
| Chimassorb 2020(C-6) Hindered amine-based | 133 | | | | | |
| Irganox 1010(C-7) Hindered phenol-based | 118 | | | 0.5 | 1 | |
| Iraganox 1076(C-8) Hindered phenol-based | 52 | | | | | 1 |
| Iraganox 565(C-9) S-containing hindered phenol | 94 | 1 | | | | |
| Iraganox 1520(C-10) S-containing hindered phenol | 14 | | | | | 1 |
| Iraganox PS 802(C-11) Sulfur-based | 65 | | 1 | | | |
| Total | | 100 | 100 | 100 | 100 | 100 |
| (Physical properties) | | | | | | |
| Specific gravity | | 1.06 | 1.06 | 1.06 | 1.06 | 1.06 |
| Vicat softening point ° C. | | 171 | 159 | 176 | 152 | 168 |
| MFR (280° C./10 kg) g/10 min | | 58.8 | 82.2 | 149 | 178 | 175 |
| IZOD kJ/m2 | | 4.8 | 5.0 | 6.2 | 6.0 | 3.5 |
| Gloss value (gloss: measurement angle 20°) % | | 96 | 92 | 106 | 90 | 92 |
| Brightness feeling of molded article (after heat aging at 150° C.) | | Good | Good | Good | Good | Good |
| Number of white spots (craters 30 μm or more in diameter) | | 56 | 63 | 38 | 64 | 71 |
| Appearance of aluminum vapor-deposited plate (visually determined) | | Poor | Poor | Fair | Poor | Poor |

As shown in Table 2, since the resin composition of Reference Example 1 had the polyphenylene ether (A) used whose reduced viscosity was relatively low ($\eta_{sp/c}$: 0.22 dl/g), it was unmoldable.

While the molded bodies made of the resin compositions of Example 15, Example 16, Example 21 and Examples 24 to 33 did not necessarily achieve satisfactory results in terms of appearance and appearance of the aluminum vapor-deposited plate, the molded bodies made of the resin compositions of Examples 17 to 20, Example 22 and Example 23 had a hindered phenol-based heat stabilizer having a melting point of 180° C. or more formulated in the composition of each resin composition not formulated with the polycarbonate resin (B3), and thus were good in terms of white spots and appearance of the aluminum vapor-deposited plate and were found to be suitably usable for automotive lamp extension molded bodies.

TABLE 3

| | | Comparative Example 3 | Example 34 | Example 35 | Example 36 | Example 37 |
|---|---|---|---|---|---|---|
| (Formulation) parts by mass | | | | | | |
| PPE-2 | η = 0.40 | | 85 | 85 | 85 | 75 |
| GPPS | 680 | | 10.5 | | | 10.5 |
| | AS | | | | | 10 |
| | Elastomer 1 | | 2 | 2 | 2 | 2 |
| | Elastomer 2 | | 2.5 | 2.5 | 2.5 | 2.5 |
| PC-1 | Wonderlite PC110 | | | 10.5 | | |
| PC-3 | APEC1800 | 100 | | | 10.5 | |
| PC-4 | Panlite L-1225Y | | | | | |
| | Total | 100 | 100 | 100 | 100 | 100 |
| (Physical properties) | | | | | | |
| | Specific gravity | 1.16 | 1.06 | 1.08 | 1.08 | 1.05 |
| | Vicat softening point ° C. | 177 | 183 | 188 | 190 | 169 |
| | MFR (280° C./10 kg) g/10 min | 5.3 | 8.7 | 10.2 | 9.8 | 16.9 |
| | Gloss value (gloss: measurement angle 20°) % | 128 | 112 | 126 | 127 | 113 |
| | Brightness feeling of molded article (after heat aging at 150° C.) | Good | Good | Good | Good | Good |
| | Number of white spots (craters 30 μm or more in diameter) | 16 | 46 | 14 | 16 | 37 |
| | Appearance of aluminum vapor-deposited plate (visually determined) | Good | Poor | Good | Good | Fair |
| | Peeling (SFD high speed injection molded piece) | Good | Good | Good | Good | Good |
| | Chemical resistance (IPA/CHX= 60/40), strain of 1%, 30 min immersion test | | | | | |
| | TY after immersing MPa | 61.8 | Poor (fracture) | 41.0 | 75.8 | Poor (fracture) |
| | TY retention rate % | 86 | — | 56 | 96 | — |
| | Chemical resistance (application of linoleic acid), strain of 1%, 30 min standing test | | | | | |
| | TY after standing MPa | 57.1 | 18.0 | 73.0 | 79.0 | 14.9 |
| | TY retention rate % | 80 | 25 | 100 | 100 | 20 |

| | | Example 38 | Example 39 | Example 40 | Example 41 | Example 42 |
|---|---|---|---|---|---|---|
| (Formulation) parts by mass | | | | | | |
| PPE-2 | η = 0.40 | 75 | 75 | 75 | 75 | 80 |
| GPPS | 680 | | | 10.5 | | |
| | AS | 10.5 | 10.5 | | 10.5 | 10.5 |
| | Elastomer 1 | 2 | 2 | 2 | 2 | 2 |
| | Elastomer 2 | 2.5 | 2.5 | 2.5 | 2.5 | 2.5 |
| PC-1 | Wonderlite PC110 | | | | 10 | 10 |
| PC-3 | APEC1800 | | 10 | 10 | | 5 |
| PC-4 | Panlite L-1225Y | 10 | | | | |
| | Total | 100 | 100 | 100 | 100 | 100 |
| (Physical properties) | | | | | | |
| | Specific gravity | 1.08 | 1.08 | 1.08 | 1.08 | 1.07 |
| | Vicat softening point ° C. | 173 | 176 | 173 | 174 | 179 |
| | MFR (280° C./10 kg) g/10 min | 17.1 | 18.9 | 18.5 | 21.4 | 8.2 |
| | Gloss value (gloss: measurement angle 20°) % | 124 | 128 | 122 | 129 | 118 |
| | Brightness feeling of molded article (after heat aging at 150° C.) | Good | Good | Good | Good | Good |
| | Number of white spots (craters 30 μm or more in diameter) | 27 | 11 | 11 | 8 | 15 |
| | Appearance of aluminum vapor-deposited plate (visually determined) | Good | Good | Good | Good | Good |
| | Peeling (SFD high speed injection molded piece) | Good | Good | Good | Good | Good |
| | Chemical resistance (IPA/CHX = 60/40), strain of 1%, 30 min immersion test | | | | | |
| | TY after immersing MPa | 35.8 | 72.2 | 31.3 | 36.7 | 47.3 |
| | TY retention rate % | 45 | 87 | 39 | 44 | 60 |
| | Chemical resistance (application of linoleic acid), strain of 1%, 30 min standing test | | | | | |
| | TY after standing MPa | 78.5 | 83.0 | 79.3 | 83.0 | 78.8 |
| | TY retention rate % | 99 | 100 | 96 | 100 | 100 |

As shown in Table 3, the molding made of the polycarbonate (B3) alone of Comparative Example 3 had a high specific gravity, and achieved insufficient results.

All the molded bodies made of the resin compositions of Example 35, Example 36 and Examples 38 to 42 having the polycarbonate resin (B3) formulated as the (B) component were more excellent in terms of while spots, appearance of the aluminum vapor-deposited plate and chemical resistance and were found to be more suitably usable for automotive lamp extension molded bodies than the molded bodies made of the resin compositions of Example 34 and Example 37 having no polycarbonate (B3) formulated.

TABLE 4

| | | Melting point (° C.) | Example 43 | Example 44 | Example 45 | Comparative Example 4 |
|---|---|---|---|---|---|---|
| (Formulation) parts by mass | | | | | | |
| PPE-4 | η = 0.30 | | 75 | 60 | 100 | 50 |
| PPE-5 | η = 0.25 | | | | | |
| GPPS | | 680 | | | | |
| AS | | | | | | |
| Elastomer 1 | | | | | | |
| Elastomer 2 | | | | | | |
| Iraganox 1330(C-1) Hindered phenol-based | | 243 | | | | |
| Iragafos 168(C-3) Phosphorus-based | | 184 | | | | |
| PEP-36(C-12) Phosphorus-based | | 235 | | | | |
| DoverPhos S-9228(C-13) Phosphorus-based | | 225 | | | | |
| PC-1 | Wonderlite PC110 | | 25 | 40 | | 50 |
| PC-2 | Wonderlite PC122 | | | | 30 | |
| Total | | | 100 | 100 | 130 | 100 |
| (Physical properties) | | | | | | |
| Specific gravity | | | 1.09 | 1.12 | 1.09 | 1.13 |
| Vicat softening point ° C. | | | 189 | 162 | 190 | 153 |
| MFR (280° C./10 kg) g/10 min | | | 47.3 | 91.8 | 41.2 | 98.8 |
| IZOD | | kJ/m2 | 2.7 | 1.8 | 2.2 | 1.4 |
| Gloss value (gloss: measurement angle 20°) % | | | 114 | 101 | 116 | 86 |
| Brightness feeling of molded article (after heat aging at 150° C.) | | | Good | Good | Good | Good |
| Number of white spots (craters 30 μm or more in diameter) | | | 15 | 32 | 16 | 49 |
| Appearance of aluminum vapor-deposited plate (visually determined) | | | Good | Good | Good | Poor |
| Peeling (SFD high speed injection molded piece) | | | Good | Good | Good | Poor |

| | | Melting point (° C.) | Example 46 | Example 47 | Example 48 | Example 49 | Example 50 |
|---|---|---|---|---|---|---|---|
| (Formulation) parts by mass | | | | | | | |
| PPE-4 | η = 0.30 | | 84 | 84 | 84 | 83 | |
| PPE-5 | η = 0.25 | | | | | | 84 |
| GPPS | | 680 | | | | | |
| AS | | | | 2 | 6 | | |
| Elastomer 1 | | | 3 | 3 | 3 | 3 | 3 |
| Elastomer 2 | | | 3 | 3 | 3 | 3 | 3 |
| Iraganox 1330(C-1) Hindered phenol-based | | 243 | | | | 1 | |
| Iragafos 168(C-3) Phosphorus-based | | 184 | | | | | |
| PEP-36(C-12) Phosphorus-based | | 235 | | | | | |
| DoverPhos S-9228(C-13) Phosphorus-based | | 225 | | | | | |
| PC-1 | Wonderlite PC110 | | 10 | 8 | 4 | 10 | |
| PC-2 | Wonderlite PC122 | | | | | | 10 |
| Total | | | 100 | 100 | 100 | 100 | 100 |
| (Physical properties) | | | | | | | |
| Specific gravity | | | 1.08 | 1.07 | 1.06 | 1.08 | 1.08 |
| Vicat softening point ° C. | | | 203 | 203 | 203 | 201 | 200 |
| MFR (280° C./10 kg) g/10 min | | | 26.2 | 27.8 | 29.3 | 27.6 | 57.9 |
| IZOD | | kJ/m2 | 5.6 | 6.6 | 6.3 | 5.8 | 4.2 |
| Gloss value (gloss: measurement angle 20°) % | | | 118 | 122 | 111 | 120 | 116 |
| Brightness feeling of molded article (after heat aging at 150° C.) | | | Good | Good | Good | Good | Good |
| Number of white spots (craters 30μm or more in diameter) | | | 17 | 15 | 29 | 16 | 17 |

TABLE 4-continued

| | | | | | | |
|---|---|---|---|---|---|---|
| Appearance of aluminum vapor-deposited plate (visually determined) | | Good | Good | Good | Good | Good |
| Peeling (SFD high speed injection molded piece) | | — | — | — | — | — |

| | Melting point (° C.) | Example 51 | Example 52 | Example 53 | Example 54 | Example 55 |
|---|---|---|---|---|---|---|
| (Formulation) parts by mass | | | | | | |
| PPE-4    η = 0.30 | | | 70 | 100 | 70 | 65 |
| PPE-5    η = 0.25 | | 83 | | | | |
| GPPS     680 | | | | | | |
| AS | | | 9 | | 8 | 13 |
| Elastomer 1 | | 3 | 3 | 3 | 3 | 3 |
| Elastomer 2 | | 3 | 3 | 3 | 3 | 3 |
| Iraganox 1330(C-1) Hindered phenol-based | 243 | 1 | | | 1 | 1 |
| Iragafos 168(C-3) Phosphorus-based | 184 | | | | | |
| PEP-36(C-12) Phosphorus-based | 235 | | | | | |
| DoverPhos S-9228(C-13) Phosphorus-based | 225 | | | | | |
| PC-1  Wonderlite PC110 | | | 15 | 30 | 15 | 15 |
| PC-2  Wonderlite PC122 | | 10 | | | | |
| Total | | 100 | 100 | 136 | 100 | 100 |
| (Physical properties) | | | | | | |
| Specific gravity | | 1.08 | 1.08 | 1.09 | 1.08 | 1.08 |
| Vicat softening point ° C. | | 199 | 183 | 184 | 180 | 171 |
| MFR (280° C./10 kg) g/10 min | | 58.9 | 59.1 | 36.9 | 57.6 | 87.4 |
| IZOD      kJ/m2 | | 4.4 | 5.7 | 7.3 | 6.2 | 5.5 |
| Gloss value (gloss: measurement angle 20°) % | | 124 | 128 | 115 | 126 | 128 |
| Brightness feeling of molded article (after heat aging at 150° C.) | | Good | Good | Good | Good | Good |
| Number of white spots (craters 30 μm or more in diameter) | | 17 | 16 | 15 | 13 | 10 |
| Appearance of aluminum vapor-deposited plate (visually determined) | | Good | Good | Good | Good | Good |
| Peeling (SFD high speed injection molded piece) | | — | Good | Good | Good | Good |

| | Melting point (° C.) | Example 56 | Example 57 | Example 58 | Example 59 | Example 60 |
|---|---|---|---|---|---|---|
| (Formulation) parts by mass | | | | | | |
| PPE-4    η = 0.30 | | 75 | 75 | 75 | 75 | 75 |
| PPE-5    η = 0.25 | | | | | | |
| GPPS     680 | | | | | | |
| AS | | 10 | 10.75 | 10.5 | 10.5 | 10.5 |
| Elastomer 1 | | 2 | 2 | 2 | 2 | 2 |
| Elastomer 2 | | 2 | 2 | 2 | 2 | 2 |
| Iraganox 1330(C-1) Hindered phenol-based | 243 | 1 | | | | |
| Iragafos 168(C-3) Phosphorus-based | 184 | | 0.25 | 0.5 | | |
| PEP-36(C-12) Phosphorus-based | 235 | | | | 0.5 | |
| DoverPhos S-9228(C-13) Phosphorus-based | 225 | | | | | 0.5 |
| PC-1  Wonderlite PC110 | | 10 | 10 | 10 | 10 | 10 |
| PC-2  Wonderlite PC122 | | | | | | |
| Total | | 100 | 100 | 100 | 100 | 100 |
| (Physical properties) | | | | | | |
| Specific gravity | | 1.08 | 1.08 | 1.08 | 1.08 | 1.08 |
| Vicat softening point ° C. | | 186 | 185 | 185 | 186 | 188 |
| MFR (280° C./10 kg) g/10 min | | 48.5 | 46.3 | 46.0 | 46.7 | 45.8 |
| IZOD      kJ/m2 | | 4.9 | 5.6 | 5.8 | 4.7 | 5.9 |
| Gloss value (gloss: measurement angle 20°) % | | 125 | 129 | 133 | 135 | 135 |
| Brightness feeling of molded article (after heat aging at 150° C.) | | Good | Good | Good | Good | Good |
| Number of white spots (craters 30 μm or more in diameter) | | 11 | 4 | 1 | 0 | 0 |
| Appearance of aluminum vapor-deposited plate (visually determined) | | Good | Good | Good | Good | Good |
| Peeling (SFD high speed injection molded piece) | | — | — | — | — | — |

As shown in Table 4, since the molding made of the resin composition of Comparative Example 4 had 50 mass % of the polycarbonate resin (B3) formulated as the (B) component, it had a relatively high specific gravity and appearance of the aluminum vapor-deposited plate was deteriorated, and it was insufficient.

All the molded bodies made of the resin compositions of Examples 49 to 60 having the polycarbonate resin (B3) formulated as the (B) component were good in terms of white spots, appearance of the aluminum vapor-deposited plate, and the like. In particular, since the molded bodies made of the resin compositions of Examples 57 to 60 had a phosphorus-based heat stabilizer formulated as the (C) component, they had a much more reduced number of white spots and better appearance of the aluminum vapor-deposited plate and thus were found to be much more suitably usable as automotive lamp extension molded bodies than other molded bodies.

The present application is based on Japanese Patent Application (Japanese Patent Application No. 2010-261661) filed on Nov. 24, 2010, Japanese Patent Application (Japanese Patent Application No. 2011-211235) filed on Sep. 27, 2011 and Japanese Patent Application (Japanese Patent Application No. 2011-246747) filed on Nov. 10, 2011, the contents of which are herein incorporated by reference.

INDUSTRIAL APPLICABILITY

The molding made of the resin composition of the present invention has a low specific gravity, good balance of heat resistance with fluidity, and excellent gloss and brightness feeling thereof, and thus can be effectively used as an automotive lamp extension molding.

The invention claimed is:

1. An automotive lamp extension molding, comprising a resin composition comprising 50 to 95 mass % of a polyphenylene ether (A) and 5 to 50 mass % of at least one resin component (B) selected from the group consisting of a non-rubber-reinforced styrene-based resin (B1) and a polycarbonate resin (B3), and having a specific gravity in the range of 1.00 to 1.12,
wherein the resin composition does not contain a crystalline polymer.

2. The automotive lamp extension molding according to claim 1, wherein the (A) component has a reduced viscosity (measured at 30° C. using a chloroform solvent) of 0.25 to 0.45 dl/g.

3. The automotive lamp extension molding according to claim 1, wherein the (A) component has a reduced viscosity (measured at 30° C. using a chloroform solvent) of 0.25 to 0.38 dl/g.

4. The automotive lamp extension molding according to claim 1, wherein the resin composition comprises the (B1) component and the (B1) component is a styrene-acrylonitrile (AS) resin having an acrylonitrile (AN) unit content of 5 to 15 mass %.

5. The automotive lamp extension molding according to claim 1, wherein the resin composition further comprises a styrene-based thermoplastic elastomer (B2), and the (B2) component is a hydrogenated substance of a styrene-conjugated diene compound block copolymer.

6. The automotive lamp extension molding according to claim 5, wherein the (B2) component comprises a hydrogenated substance (B2-1) of a styrene-conjugated diene compound block copolymer having bound styrene content of 45 to 80 mass % and a hydrogenated substance (B2-2) of a styrene-conjugated diene compound block copolymer having bound styrene content of 20 to 40 mass %, at a mass ratio of (B2-1)/(B2-2)=4/1 to 1/4.

7. The automotive lamp extension molding according to claim 1, wherein the resin composition comprises the (B3) component and the (B3) component is an aromatic polycarbonate resin comprising a divalent phenol residue in a molecular skeleton thereof.

8. The automotive lamp extension molding according to claim 1, wherein the resin composition comprises the (B3) component and the (B3) component is a polycarbonate resin comprising a bisphenol residue having a cyclohexane ring incorporated in a molecular skeleton thereof.

9. The automotive lamp extension molding according to claim 1, wherein the resin composition comprises the (B3) component and the (B3) component has an MFR (a test method according to ISO1133, measured at a measurement temperature of 300° C. and at a load of 1.2 kg) in the range of 0.5 to 25 g/10 min.

10. The automotive lamp extension molding according to claim 1, wherein the resin composition comprises 5 to 40 mass % of the (B3) component.

11. The automotive lamp extension molding according to claim 1, wherein the (B) component comprises a styrene-acrylonitrile (AS) resin having an acrylonitrile (AN) unit content of 5 to 15 mass %, and a polycarbonate resin.

12. The automotive lamp extension molding according to claim 1, wherein the resin composition further comprises 0.01 to 5 mass % of a heat stabilizer component (C).

13. The automotive lamp extension molding according to claim 12, wherein the (C) component is a heat stabilizer having a melting point of 180° C. or more.

14. The automotive lamp extension molding according to claim 12, wherein the (C) component is a hindered phenol-based heat stabilizer.

15. The automotive lamp extension molding according to claim 12, wherein the (C) component is a phosphorus-based heat stabilizer.

16. The automotive lamp extension molding according to claim 1, wherein the resin composition has an MFR (measured at 280° C. and at 10 kg) of 20 g/10 min or more, and a Vicat softening temperature (according to ISO306, measured at a test load of 50 N, and at a heating rate of 120° C./hr) of 160° C. or more.

17. The automotive lamp extension molding according to claim 1, having a glossy surface having a gloss value at a measurement angle of 20° in the range of 90 to 140%.

18. The automotive lamp extension molding according to claim 1, wherein the number of white spots (indicating protrusions having crater-like recesses 30 μm or more in diameter) present in an area of 52.4 mm$^2$ of a specular portion of the molding is 40 or less.

19. The automotive lamp extension molding according to claim 1, configured for placement between a reflector and a lamp front cover.

* * * * *